(12) United States Patent
Flick et al.

(10) Patent No.: US 8,560,496 B2
(45) Date of Patent: Oct. 15, 2013

(54) DATABASE QUERY ACROSS PROCESSES WITH CHANGE NOTIFICATION

(75) Inventors: Mark S. Flick, Redmond, WA (US); Ying Ding, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/305,749

(22) Filed: Nov. 29, 2011

(65) Prior Publication Data

US 2013/0138658 A1 May 30, 2013

(51) Int. Cl.
*G06F 17/00* (2006.01)

(52) U.S. Cl.
USPC ............ 707/613; 707/661; 707/689; 709/203

(58) Field of Classification Search
USPC .................. 707/610, 613, 661, 689, 736, 741
See application file for complete search history.

(56) References Cited

U.S. PATENT DOCUMENTS

| | | | |
|---|---|---|---|
| 6,895,401 B2 | 5/2005 | Skinner et al. | |
| 7,788,270 B2 | 8/2010 | Bernard | |
| 2004/0133538 A1* | 7/2004 | Amiri et al. | 707/1 |
| 2008/0077557 A1* | 3/2008 | Schneider et al. | 707/2 |
| 2009/0144258 A1* | 6/2009 | Taylor | 707/5 |

OTHER PUBLICATIONS

Mokbel, et al., "SINA: Scalable Incremental Processing of Continuous Queries in Spatio-temporal Databases", Retrieved at <<http://www.cs.purdue.edu/homes/aref/papers/SINA-Sigmod04.pdf>>, International conference on Management of Data (SIGMOD), Jun. 18, 2004, pp. 623-634.
Galindo-Legaria, et al., "Database Change Notifications: Primitives for Efficient Database Query Result Caching", Retrieved at <<http://vldb.idi.ntnu.no/program/paper/demo/p1275-galindo-legaria.pdf>>, Proceedings of the 13th International conference on Very large Data Bases, Sep. 2, 2005, pp. 1275-1278.
Yalamanchi, et al., "Managing Expressions as Data in Relational Database Systems", Retrieved at <<http://pages.cs.brandeis.edu/~cs227b/papers/pubsub/YSG03-Managing.pdf>>, First Biennial Conference on Innovative Data Systems Research (CIDR), Jan. 8, 2003, pp. 11.
"More OCI Advanced Topics", Retrieved at <<http://download.oracle.com/docs/cd/B28359_01/appdev.111/b28395/oci10new.htm>>, Retrieved Date: Sep. 9, 2011, pp. 24.
"NHibernate—Relational Persistence for Idiomatic .NET", Retrieved at <<http://www.nhforge.org/doc/nh/en/index.html>>, Retrieved Date: Sep. 9, 2011, pp. 145.

* cited by examiner

*Primary Examiner* — Dennis Truong

(57) ABSTRACT

Indexes for predefined search orders of items in a database are generated and stored. When a client issues a database query a responsive pre-generated index list is retrieved and provided to the client for use in, e.g., populating a U/I view for a user. Only those items that a client needs, e.g., for populating a current U/I view, are retrieved from the database and output to the client. When a change is rendered to the database, e.g., an item is added or deleted or an existing item is altered, only the change is output to the client, rather than the entire modified index or altered item. In this manner clients can more quickly and efficiently respond to user data query requests by performing some processing upfront and by limiting communications traffic to communications relevant to the client's current processing.

15 Claims, 12 Drawing Sheets

DATABASE QUERY ACROSS PROCESSES WITH CHANGE NOTIFICATION

BACKGROUND

Querying, filtering, ordering and managing data are common operations for clients accessing databases managed by a common server. Often these clients access and acquire data to present to users in one or more U/I (user/interface) views, or displays. Managing database queries can involve loading all the necessary data from the database to a client's memory, or cache. When a user requests a database view, i.e., a collection of data to be presented in a desired format, or order, the client that the user is accessing can retrieve all the data for the requested database view from the database, e.g., all the data stored in a database container that is responsive to the user requested database view. The client can then order the data and subsequently generate the requisite view, displaying a screen's worth of the database view to the user.

However, as databases become more populated, and thus larger, the retrieval of the data from its database becomes much more cumbersome and the process can take a not insignificant time. Moreover, arranging the retrieved data on the fly subsequent to a user database review request can be very processing intensive and, consequently, time consuming. These labor-intensive efforts upfront, prior to any display being generated in response to a user request, can pose user perceivable time delays. These noticeable time delays can, in turn, lead to user dissatisfaction and frustration and can themselves translate into less than optimal user performance.

Thus it is desirable to minimize the flow of communications, and data, between a server that supports a database and a client for database queries that are the result of user requests for database views. It is further desirable to communicate only the information that a client currently needs to mitigate user perceived delays in presenting U/I views to the user in response to user requested database views. It would also be advantageous to perform processes, or functions, supporting client database queries upfront and unattached to any particular client database query.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include methodologies for managing database queries that are utilized by various components, e.g., the database, a server, and a client controller of a client, of an embodiment database query management system, or environment.

In embodiments each item stored in a database is provided a unique identification, also referred to herein as id, for the duration of the time the item remains stored within the database. In embodiments indexes of one or more item ids are pre-generated pursuant to predefined search orders and stored in the database and accessible to the server that is a local process that supports the database.

In embodiments the server of a database query management system locally stores indexes responsive to currently open database queries, i.e., database queries that are currently being processed, from clients within the database query management environment. In embodiments, in response to a database query from a client the server provides the client an index that was pre-generated and stored in the database and which is responsive to the client's database query. In embodiments, in response to a database query from a client the server accesses two or more currently existing indexes stored in the database and generates a new, hybrid, index from the two or more currently existing indexes that is responsive to the client's database query and provides this new, hybrid, index to the client.

In embodiments the server provides items responsive to a client's item requests to the client in response to the client's item requests. In embodiments the server is notified of database changes and determines each database change for notifying any clients that may be affected by the change. In embodiments, in response to a database change the server makes the necessary changes within the server local cache and notifies each potentially affected client of the change.

In embodiments a client of a database query management system has a client controller that assists in supporting the client's database queries and the client's generation and maintenance of U/I views to users in response to user data queries. In embodiments in response to a client database query the client controller retrieves a responsive index from the server and stores the index in the client local cache. In embodiments the client controller utilizes stored indexes to apprise the client of the items, in their correct order, that are responsive to a client's database query for, e.g., generating a U/I view to be presented to a user. In embodiments the client controller obtains and provides only those database items responsive to its client's database query that the client is to use for, e.g., populating a U/I view. In embodiments the client controller is notified of database changes, renders the appropriate modifications to items and/or indexes stored in the client local cache and notifies the client of the changes, which the client can then determine to be relevant or not to its current processing.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details.

In other instances well-known structures and devices are either simply referenced or shown in block diagram form in order to avoid unnecessary obscuration. Any and all titles used throughout are for ease of explanation only and are not for any limiting use.

Figure 1:
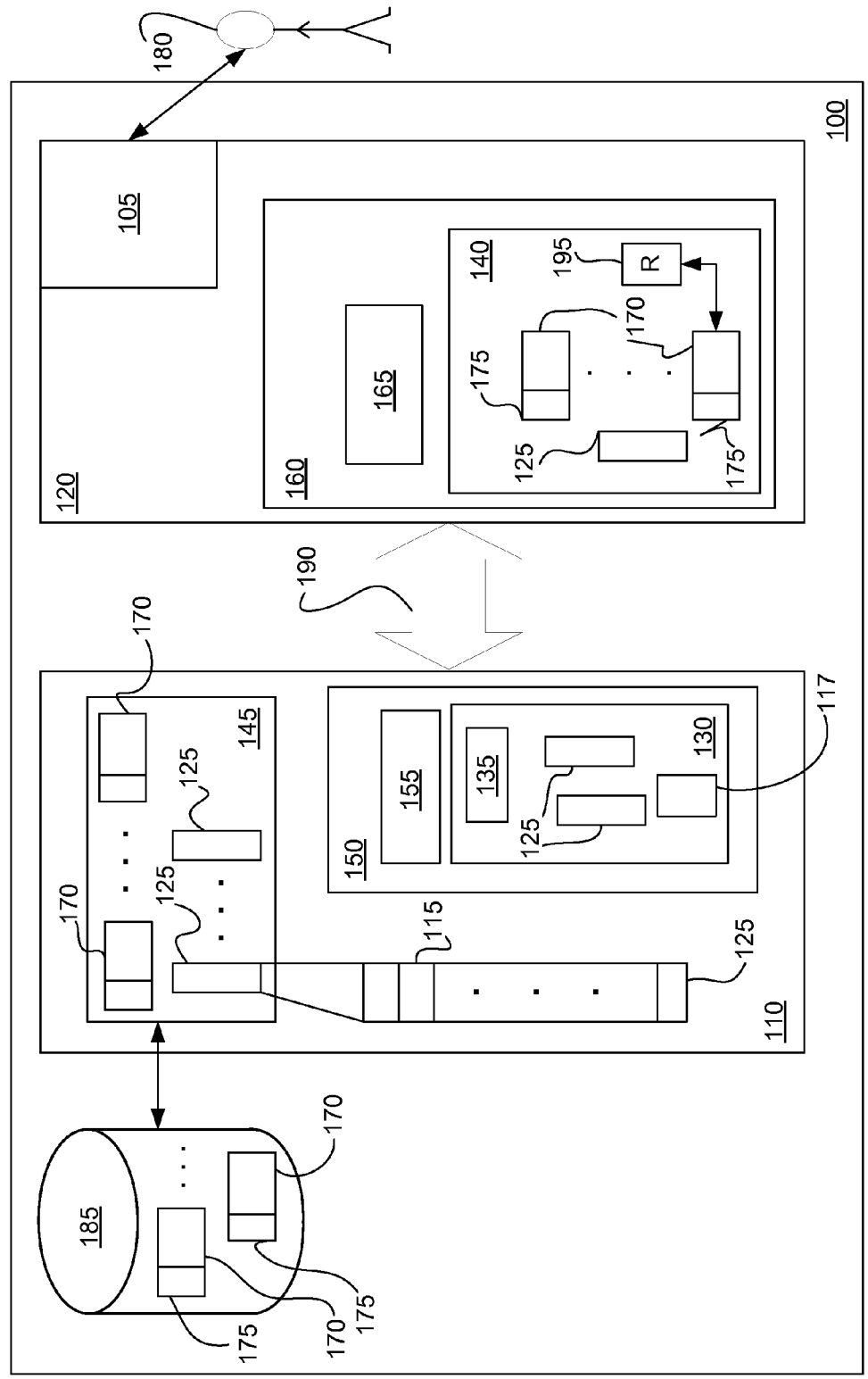
FIG. 1 depicts an embodiment database query management system supporting the management of database queries.

FIG. 1 depicts an embodiment database query management system 100, also referred to herein as an embodiment database query management environment 100, supporting the handling of database queries issued from one or more clients 120 to a server 110. In an embodiment the server 110 operates on one computing device 700 and at least one client operates on the same computing device 700. Thus, in an embodiment the server 110 and the client(s) 120 in an embodiment database query management environment 100 are resident on the same computing device 700.

Computers and computer-based devices, e.g., PDAs (personal digital assistants), smart cellphones, etc., are collectively referred to herein as computing devices 700 and are further discussed with reference to FIG. 7.

In an embodiment the server 110 includes a server controller 150 that is, or otherwise includes, software for managing database queries on the server-side for a database 145 within the database management query system 100.

In an embodiment the server controller 150 has, or has access to, one or more server applications, or apps, 155 that are executable software, e.g., a procedure, application, routine, etc., for performing one or more functions. In an embodiment the server apps 155, collectively referred to herein as the server app 155, is controlled to execute by the server 110.

In an embodiment the server 110 has a server local cache 130, i.e., memory, that is under the control of, or otherwise accessible by, the server controller 150. In an embodiment the server local cache 130 is used to store information relevant to database query management within the database management query system 100 as further discussed below.

In an embodiment each client 120 within the database management query system 100 includes a client controller 160, also referred to herein as a client.dll 160, that is, or otherwise includes, software for managing database queries for the respective client-side to the database 145 within the database management query system 100.

In an embodiment the client controller 160 has, or has access to, one or more client applications, or apps, 165 that are executable software for performing one or more functions. In an embodiment the client apps 165, collectively referred to herein as the client app 165, is controlled to execute by the respective client 120.

In an embodiment each client 120 has a client local cache 140, i.e., memory, that is under control of, or otherwise accessible by, the client controller 160. In an embodiment the client local cache 140 is used to store information relevant to database query management within the database management query system 100 as further discussed below.

As previously noted, the database query management system 100 includes a database 145 that stores one or more objects 170, also referred to herein as items 170, and is managed by, or otherwise accessible to, the server 110, also referred to as the out of process server 110.

In an embodiment the database 145 for the database management query system 100 is stored in memory that is resident on 145 or, alternatively, external to 185, e.g., an external disk drive, the server's computing device 700 and is accessible by the server 110 and the server controller 150. For purposes of discussion herein the database 145, whether stored in memory 145 on the same computing device 700 that hosts the server 110 and/or on an external storage device 185, is generically referred to herein as the database 145.

In an embodiment each item 170 stored in the database 145 can have one or more properties, or fields, of information. An item 170 can be any data that a user 180, i.e., any person accessing the database 145 or software executing on a computing device 700 that accesses the database 145 determines to keep, i.e., store, including, but not limited to, mail messages, contacts, people biographies, photographic images, etc. A property of an item 170 can consist of any information about the item, e.g., the sender of an email item 170, the date an email item 170 was sent, the contact name in a contact item 170, etc.

In an embodiment at least one client 120 has the capability to display a user interface (U/I) view 105 to a user 180. In an embodiment a U/I view 105 includes the display of one or more item properties for one or more items 170 stored in the database 145; e.g., one U/I view 105 is email messages sorted by date, another U/I view 105 is contacts sorted alphabetically by contact person, etc.

In an embodiment each item 170 stored in the database 145 is assigned a unique identification, or id, 175. In an aspect of this embodiment each item 170 stored in the database 145 is assigned a unique id 175 at the time the item 170 is stored, i.e., committed, to the database 145. In an embodiment an item 170 retains its unique id 175 for the entire duration that the item 170 is maintained, i.e., stored, in the database 145.

In an embodiment an id 175 for an item 170 is a unique value stored in a standard memory-size location associated with the respective item 170. In an aspect of this embodiment the standard memory-size for an id 175 is four (4) bytes. In alternative aspects of this embodiment the standard memory-size for an id 175 is other memory-sizes, e.g., one (1) byte, four (4) bits, eight (8) bytes, etc.

In an embodiment an id 175 for an item 170, also referred to herein as an item id 175, has two components, or portions: a table id portion and an object id portion. In an embodiment the table id portion of an item id 175 identifies the storage container, e.g., table, that the item 170 is stored in or otherwise associated with in the database 145, e.g., an email storage container, a contact storage container, a picture storage container, etc. In an embodiment the object id portion of an item id 175 uniquely identifies the item 170 within its storage container. In an aspect of this embodiment object id portions of item ids 175 for items 170 in, or otherwise associated with, a particular storage container of the database 145 are monotonically increasing numbers. In alternative aspects of this embodiment object id portions of item ids 175 for items 170 in, or otherwise associated with, a particular storage container of the database 145 are numbers assigned based on other schemes, e.g., randomly assigned unique numbers, monotonically decreasing numbers, etc.

In an embodiment the table id portion and the object id portion of an item id 175 are concatenated to formulate the unique id 175 for the item 170.

In other embodiments an item id 175 is generated based on other schemes and/or formulas, e.g., each id 175 for each item 170 in the database 145 is a unique random number; each id 175 for an item 170 in, or otherwise associated with, a particular storage container of the database 145 is a value within a predetermined value range, e.g., zero to one-hundred (0-100), one to one thousand (1-1000), etc., associated with the storage container, etc.

In an embodiment one or more search orders for the items 170 in the database 145 and/or one or more subsets of the items 170 in the database 145 are predefined. Exemplary search orders include, but are not limited to, emails arranged by date, emails arranged alphabetically by last name of sender, contacts arranged alphabetically by contact person's last name, contacts arranged alphabetically by contact person's place of business, etc.

In an embodiment an index 125 is generated for each predefined search order for the database 145. In this embodiment search orders are precalculated and stored in indexes 125, and thus, when a database query is issued from a client 120 to the server 110 the server 110 can respond quickly and with less data by obtaining the appropriate pre-generated index(es) 125 from the database 145 and outputting it to the client 120.

In an embodiment when an index 125 is generated it is stored in, or otherwise associated with, the database 145.

In an embodiment an index 125, when generated, is a list of one or more index entries 115. In alternative embodiments an index 125 is stored in other formats, e.g., a table, a linked list, etc.

In an embodiment each index entry 115 of an index 125 is an id 175 for an item 170 of the database 145 positioned in the proper order of the index 125 for the respective search order. An id 175's order in an index 125 is determined by the property(ies) of the underlying item 170 that are the subject of the respective search order.

Figure 2:
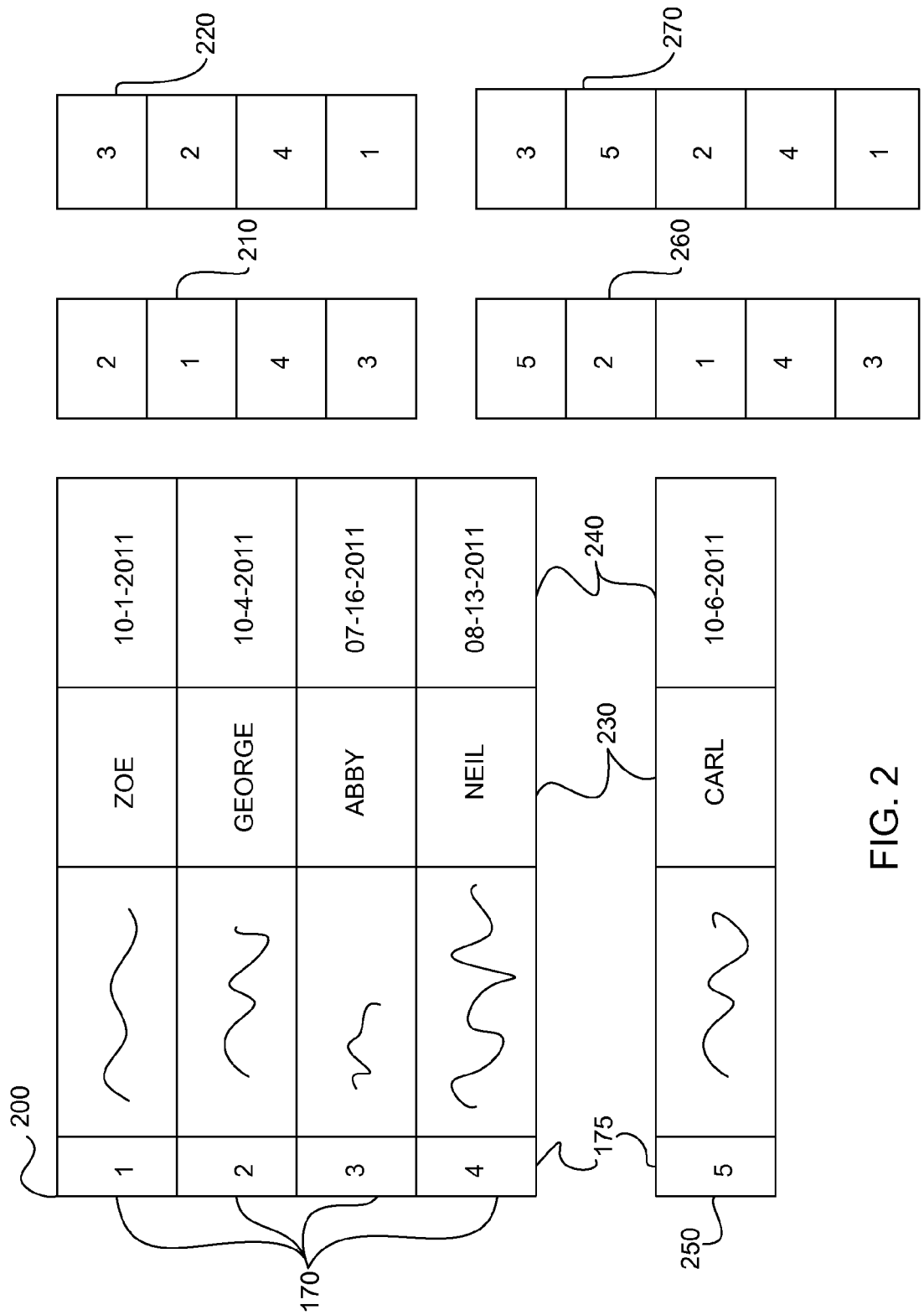
FIG. 2 depicts exemplary database entries and predetermined indexes for supporting client database queries.

Referring to FIG. 2 as an example, exemplary index 210 has been generated for a search order of the email items 170 stored in storage container, e.g., table, 200 arranged by date issued, with newest email item 170 identified as the first item 170 in the index 210. In exemplary index 210 the order of the ids 175 for the respective items 170 in table 200 are determined by each item 170's date issued property, or field, 240.

As a second example, exemplary index 220 has been generated for a search order of the same email items 170 stored in storage container, e.g., table, 200 arranged alphabetically by sender. In exemplary index 220 the order of the ids 175 for the respective items 170 in table 200 are determined by each item 170's sender property, or field, 230.

As noted, in an embodiment each index 125 is maintained in, or otherwise associated with, the database 145. In an embodiment each time there is a change in the database 145, e.g., a new item 170 is added, an existing item 170 is deleted, one or more properties of an existing item 170 that are used for an existing search order, e.g., contact person name, is altered, the server controller 150 is notified of the database change by the database 145. In an embodiment, if the change is to an index 125, e.g., a new item 170 has been added to an index 125 or a deleted item 170 has been removed from an index 125 maintained in the database 145, the server controller 150 determines the change and updates the affected indexes 125, if any, that are stored in the server local cache 130, and thus, are presumptively relevant to one or more database queries from one or more clients 120.

For example, new exemplary email 250 of FIG. 2 is generated and subsequently stored in the email storage container 200 of the database 145. In this example exemplary email 250 is assigned an id 175 with a value of five (5). In this example email 250 was sent by Carl, e.g., sender property 230 is "Carl," and was issued on Oct. 6, 2011, e.g., date issued property 240 is "Oct. 6, 2011".

In an embodiment and the example of FIG. 2, the server controller 150 is notified by the database 145 of the change, e.g., the addition of email 250 to the database 145. In an embodiment and this example the server controller 150 modifies index 210 for a search order of email items 170 stored in storage container 200 arranged by date issued that is currently stored in the server local cache 130 so that it is now new index 260 with the newest email 250 identified by its id 175 with a value of five (5) as the first item 170 in the new index 260. As with the prior index 210, in exemplary index 260 the order of the ids 175 for the respective items 170 in table 200 are determined by each item 170's date issued property, or field, 240.

In an embodiment and the example of FIG. 2 the server controller 150 also modifies index 220 for a search order of the email items 170 stored in storage container 200 arranged alphabetically by sender that is currently stored in the server local cache 130 so that it is now new index 270 with the newest email 250 identified by its id 175 with a value of five (5) as the second item 170 in the new index 270. As with the prior index 220, in exemplary index 270 the order of the item ids 175 are determined by each item 170's sender property, or field, 230.

Referring again to FIG. 1, in an embodiment indexes 125 defined by search orders for items 170 are used by a client 120 to generate U/I views 105 displayed to a user 180. In an embodiment one index 125 can be used to generate a U/I view 105, or portion of a U/I view 105, collectively referred to herein as a U/I view 105, for output to a user 180. For example, an index 125 for emails arranged by date, e.g., index 260 of FIG. 2, can be utilized by a client 120 to output a U/I view 105 of emails arranged by date to a user 180.

In an embodiment a combination of two or more indexes 125 can be collated by the server controller 150 to generate a new, hybrid, index 125 that can then be utilized by a client 120 to generate a U/I view 105 for output to a user 180. For example, the server controller 150, pursuant to a database query from a client 120, can utilize two existing indexes 125, e.g., an index 125 for emails arranged by sender, e.g., index 270 of FIG. 2, and an index 125 for users 180 that are currently online, to generate a third, hybrid, index 125 that consists of the item ids 175 for only those emails, arranged by sender, where the sender is currently online.

In an embodiment database query management system 100 a client 120 communicates with a server 110 to issue a database query for generating a U/I view 105 to be output to a user 180. In an embodiment a client 120 and the server 110 of the database query management system 100 communicate across an RPC boundary 190. In an embodiment an RPC boundary 190 is the communication path and protocol for managing remote procedure calls (RPCs) that supports the client app 165 having the capability to cause the server app 155 to execute for processing a database query without the client app 165 explicitly containing software for managing the details of this remote interaction.

In an embodiment there are various communications that are issued via the RPC boundary 190 between a client 120 and the server 110 for managing client database queries. In an embodiment a client 120 and the server 110 can communicate to generate a U/I view 105 to output to a user 180 in response to a user's data query, e.g., a user's request for a display of one or more database items 170.

Figure 3:
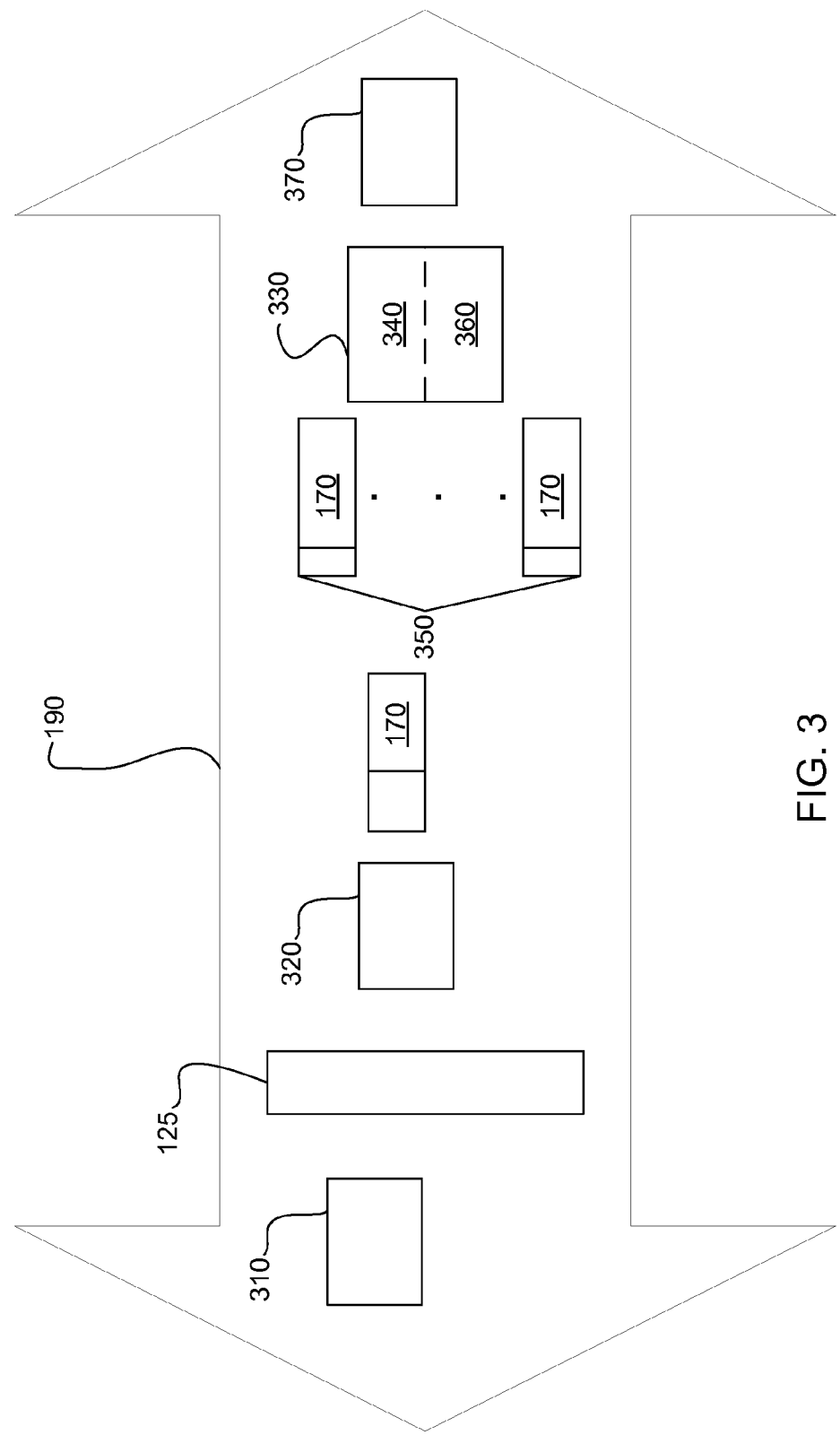
FIG. 3 depicts an embodiment RPC boundary and embodiment communications that are transferred across the RPC boundary between a server and a client in a database query management system.

Referring to FIG. 3 in an embodiment a client 120 issues a database query 310 to the server 110 via the RPC boundary 190. Referring again to FIG. 1, in an embodiment, in response to a database query 310 the server 110 retrieves the appropriate index 125, or indexes 125, from the database 145 and stores them in the server local cache 130. In an embodiment, if there is only one existing index 125 for satisfying the current database query 310, e.g., an index 125 for emails sorted by date in response to a database query 310 for emails sorted by date, then in an embodiment, and referring also to FIG. 3, the server 110 outputs the index 125 to the requesting client 120.

In an embodiment if two or more existing indexes 125 are to be used to satisfy the current database query 310, e.g., a first existing index 125 for emails sorted by sender and a second existing index 125 identifying users 180 currently on line in response to a database query 310 for emails sorted by senders who are currently online, then the server controller 150 retrieves the requisite indexes 125 from the database 145 and stores them in the server local cache 130. In an embodiment the server controller 150 utilizes the retrieved indexes 125 to generate a new, hybrid, index 125 which it also stores in the server local cache 130. In an embodiment the server 110 thereafter outputs the new, hybrid, index 125 to the requesting client 120.

In an embodiment, upon receiving an index 125 the client 120 stores the index 125 in the client local cache 140.

In an embodiment there are multiple copies of an index 125 stored in the database query management system 100 when a client 120 issues a database query 310 to the server 110. For example, for the case where a single index 125 is sufficient to respond to a client database query 310, e.g., an index 125 for emails sorted by date, there is one, the original, index 125 that is stored in the database 145, a second index 125 that is stored in the server local cache 130 upon the server 110 receiving the database query 310 from a client 120, and a third index 125 that is stored in the client local cache 140 upon the server 110 outputting the index 125 to the client 120 in response to the client database query 310. As another example, for a case where two indexes 125 are utilized to create a third, hybrid, index 125 that is responsive to a client database query 310 there can be six maintained indexes 125. In this second example there are two, original, indexes 125 stored in the database 145; there are three indexes 125 that are stored in the server local cache 130, i.e., the two, original indexes 125 and the third, newly created index 125; and there is one index 125 that is stored in the client local cache 140, i.e., the third, newly created index 125 that is responsive to the client's database query 310.

In an embodiment the client 120 utilizes the received index 125 to determine which item(s) 170 to request from the database 145 for, e.g., generating a U/I view 105 to be output to the user 180 in response to a user's data query. In an aspect of this embodiment the client 120 asks the client controller 160 to identify the item 170 for a particular position in the U/I view 105 the client 120 is generating.

For example, a client 120 may ask its client controller 160 to identify the first item 170 for emails sorted by date, i.e., the first item 170 identified in an index 125 for emails sorted by date. In this example the client controller 120 reviews the requisite index 125 it received from the server 110 and is stored in the client local cache 140 and return the first item id 175 in the index 125. In this example the client 120 can then issue an item request 320 for the item 170 identified by the first item id 175 in the index 125.

As a second example, a client 120 may be formulating a U/I view 150 that displays emails by date but starts with an email that was issued a month prior, e.g., the fiftieth (50$^{th}$) email identified in the index 125 for emails arranged by date. In this second example the client controller 120 reviews the requisite index 125 it received from the server 110 and is stored in the client local cache 140 and returns the fiftieth item id 175 in the index 125. In this second example the client 120 can then issue an item request 320 for the item 170 identified by the fiftieth item id 175 in the index 125.

In an embodiment the client 120 issues an item request 320 for an item 170 identified in the index 125 to the server 110. In an aspect of this embodiment an item request 320 is for one item 170.

In an embodiment the client 120 issues an item request 320 to the client controller 160. In an embodiment the client controller 160 issues the item request 320, via the RPC boundary 190, to the server 110 if the item 170 that is the subject of the item request 320 is not currently stored in the client local cache 140.

In an embodiment upon receiving an item request 320 the server 110 retrieves the identified item 170 from the database 145 and outputs the item 170 to the requesting client 120.

In an embodiment the server 110 stores the retrieved item 170 in the server local cache 130. In an embodiment, having a copy of an item 170 output to a client 120 in the server local cache 130 supports the server controller 150 identifying changes to items 170 made in the database 145 while the item 170 is being utilized by a client 120, as further discussed below.

In an embodiment the server 110 keeps track of the items 170 it outputs to a client 120 for an open, i.e., currently processing, database query 310. In an aspect of this embodiment the server 110 generates and maintains an item list 135 that identifies the items 170 output to a client 120 for an open database query 310. In an aspect of this embodiment the item list 135 is a list of the item ids 175 for those items 170 output to a client 120.

In an embodiment the client controller 160 receives an item 170 sent from the server 110, stores the item 170 in the client local cache 140 and notifies the client 120 that the item 170 is available for the client 120 to utilize for e.g., generating a U/I view 105.

In an embodiment a client 210 can notify the server 110 of a page size 117, also referred to herein as a client item count 117, that consists of the number of items 170 that the client 120 typically utilizes for generating a U/I view 105, e.g., a client 120 may generally populate one screen of twenty (20), thirty (30), etc., displayed items 170 in response to a user 180 data request. In an aspect of this embodiment a client 210 notifies the server 110 of its page size 117 via a database query 310 issued to the server 110. In an alternative aspect of this embodiment a client 120 notifies the server 110 of its page size 117 via alternative communications to the server 110, e.g., a page size message, as part of communications between a client 120 and the server 110 when the client 120 registers with the server 110, etc. In another alternative aspect of this embodiment the server 110 is programmed with the page size 117 for one or more clients 120 via a user 180, e.g., a system administrator, etc.

In an embodiment the server 110 stores the page sizes 117 for clients 120 in the server local cache 185. In an embodiment the server 110 stores page sizes 117 in the database 145.

In an embodiment if the server 110 has a page size 117 for a client 120 that has issued an item request 320 to the server 110 the server 110 will retrieve the number of items 170 from the database 145 that is equal to the client's page size 117 and output the group of retrieved items 350 to the client 120. In an aspect of this embodiment the server 110, upon receiving an item request 320 from a client 120, determines whether it has a page size 117 for the client 120. If yes, in an embodiment the server 110 retrieves the requested item 170 from the database 145 as well as the next number of items 170 identified in the index 125 for the client's open database query 310 that collectively are a set, or group, 350 of the page size 117 number of items 170 for the client 120. In an embodiment the server 110 outputs the set 350 of page size 117 number of items 170 retrieved from the database 145 to the client 120 in response to a client item request 320.

In this embodiment, therefore, the server 110 can output a set 350 of two or more items 170 identified in an index 125 to a client 120 for an open database query 310 in response to a single item request 320 issued from the client 120. In this embodiment the database query management system 100 can increase the productivity and communications throughput between a client 120 and the server 110 by knowledgeably anticipating and outputting a set 350 number of items 170 that the client 120 will utilize for a U/I view 105. In this embodiment a client 120 and the server 110 can reduce their RPC boundary communications because one item request 320 can result in a set 350 of two or more relevant items 170 being output from the database 145, via the server 110, to the client 120. In this embodiment a client 120 and the server 110 also reduce the communications traffic between them as only the number of items 170 that the client 120 will utilize for any given U/I view 105 is output to the client 120 at any one time.

In an embodiment a client 120 continues to issue item requests 320 to its client controller 160 for each item 170 the client 120 is attempting to include in a U/I view 105. In an embodiment if the item 170 that is the subject of an item request 320 is already stored in the client local cache 140 the client controller 160 simply retrieves the subject item 170 from the client local cache 140 and returns it to the client 120. In this embodiment the client controller 160 does not need to forward the item request 320 to the server 110 as the desired item 170 item 170 is already available in the client local cache 140.

In an embodiment the client controller 160 keeps track of the items 170 stored in the client local cache 140, and thus can determine whether to forward an item request 320 to the server 110 or simply retrieve the item 170 that is the subject of an item request 320 from the client local cache 140.

In an embodiment when a client 120 is done with a database query 310, e.g., the user 180 desires a new U/I view 105, the client 120 notifies the client controller 160 that the database query 310 is closed, or finished. In an aspect of this embodiment the client 120 issues a database query close message 370 identifying a particular existing database query 310 to notify its client controller 160 that the database query 310 is now to be closed.

In an embodiment the client controller 160 flushes, e.g., deletes from, or otherwise no longer keeps track of in, the client local cache 140 those items 170 and index(es) 125 that are responsive to a closed database query 310 and which are not being utilized for any other open database query 310 for the client 120.

In an alternative embodiment the client controller 160 can maintain the notification of a closed database query 370 from the client 120 and wait to determine if a new database query 310 will utilize an index 125 and/or items 170 that were gathered for the now closed database query 310 and are currently stored in the client local cache 140. In an aspect of this embodiment the client controller 160 waits a predetermined amount of time before acting on the notification of a closed database query 370 and flushing the client local cache 140 of indexes 125 and items 170 that are not necessary for any currently open database query 310.

In a second aspect of this embodiment the client controller 160 waits a predetermined number of new database queries 310 from the client 120 before acting on the notification of a closed database query 370 and flushing the client local cache 140 of indexes 125 and items 170 that are not being utilized for any currently open database query 310.

In a third aspect of this embodiment the client controller 160 utilizes a predetermined percentage of the client local cache 140 for maintaining indexes 125 and items 170 before acting on the notification of a closed database query 370 and flushing the client local cache 140 of indexes 125 and items 170 that are not being utilized for any currently open database query 310; e.g., when the client local cache 140 is seventy-five percent (75%) utilized the client controller 160 will act on the notification of a closed database query 370, etc.

In other aspects of this embodiment other criteria are utilized for signifying to the client controller 160 that it is to act upon a pre-existing notification of a closed database query 370, e.g., when a predetermined time limit has expired; when a user 180 notifies the client controller 160 to flush the client local cache 140; etc.

In an embodiment the client controller 160 notifies the server 110 when the client 120 is finished with a database query 310. In an aspect of this embodiment the client controller 160 outputs the client's database query close message 370, identifying a particular existing database query 310, to the server 110 to notify the server 110 that the database query 310 is now to be closed.

In an embodiment the server controller 150 flushes the server local cache 130 for the items 170, item list(s) 135 and index(es) 125 responsive to the closed database query 310 that are not currently being otherwise utilized.

As previously noted, in an embodiment each time there is a change in the database 145, e.g., a new item 170 is added, an existing item 170 is deleted, one or more properties of an existing item 170 that are used for an existing search order, e.g., contact person name, is altered, the server controller 150 is apprised of the database change. In an embodiment, if the change affects an index 125 stored in the server local cache 130 or an item 170 that has been output to a client 120, the server controller 150 determines the difference the change has created.

In an embodiment, if the current change to the database 145 is the addition or deletion of an item 170 the database 145 provides the updated indexes 125 stored in the database 145 that were affected by the change to the server controller 150.

In an embodiment, if there is a copy of an index 125 affected by a database change currently stored in the server local cache 130 the server 110 will determine the difference that the database change has created. For example, with the addition of email item 250 of FIG. 2 to the database 145 if index 210 is currently stored in the server local cache 130 when the database 145 notifies the server 110 of this addition, then the server 110 determines that the id 175 with a value of five (5) is to be the new first entry 115 in the respective index 125. In an embodiment the server 110 replaces index 210 with index 260 that was previously generated from updating index 210 and stored in the database 145. In an embodiment the server 110 issues a change notification message 330, as shown in FIG. 3, to the client(s) 120 for which the original index 210 was being stored in the server local cache 130. In an embodiment the server 110 only notifies clients 120 of the change(s) to items 170 and/or indexes 125. In this embodiment the server 110 does not supply clients 120 with entire updated indexes 125 or newly modified items 170 pursuant to database changes 145, and thus, in this embodiment communications traffic between the server 110 and clients 120 is minimized.

Referring again to FIG. 3, in an embodiment a change notification message 330 has two parts. In an embodiment the first part 340 of a change notification message 330 is a notification, or identification, that there has been a database change. In an aspect of this embodiment the first part 340 of a change notification message 330 identifies whether the database change is to an index 125 or to an item 170.

In an embodiment the second part 360 of a change notification message 330 is the difference, or change, that has occurred. For example, and referring to FIG. 2, the second part 350 of a change notification message 330 can be an indication that item id 175 five (5) is to be the new first index entry 115 for the index 125 for emails sorted by date. As a second example, the second part 350 of a change notification message 330 can be a new phone number for a contact item 170.

In an embodiment when the client controller 160 receives a change notification message 330 for a change to an index 125 the client controller 160 uses the change notification message 330 to make the change to the copy of the respective affected index 125 stored in the client local cache 140. In an embodiment the client controller 160 notifies the client 120 of the change.

In an embodiment, if the client 120 does not care about the change, i.e., the client 120 is not currently maintaining a U/I view 105 that will be altered due to the change, then the client 120 does nothing and the change has been fully propagated through the database query management system 100 at this time.

In the situation where there has been a deletion of an item 170 from the database 145 and the client 120 does care about the change, e.g., the client 120 is currently maintaining a U/I view 105 that will be altered due to the change, then in an embodiment the client 120 utilizes the information supplied by the client controller 160 for the item deletion change to remove the currently deleted item 170, e.g., from the U/I view 105. In this situation of a deleted item 170, as the client 120 has one less item 170 now, e.g., currently displayed in the U/I view 105, the client 120 asks the client controller 160 to identify the next item 170 identified in the respective index 125. In an embodiment the client controller 160 will respond with the id 175 for the next identified item 170. In an embodiment the client 120 issues an item request 320 to the client controller 160 for this new identified item 170.

In an embodiment, if the newly identified item 170 is already stored in the client local cache 140 the client controller 160 retrieves the item 170 from the client local cache 140 and provides it to the client 120. In an embodiment and this case the client 120 then can utilize the new item 170, e.g., to display in its correct position in the current U/I view 105. In an embodiment the database change of an item 170 deletion has now been fully propagated through the database query management system 100.

In an embodiment, if the newly identified item 170 is not currently stored in the client local cache 130 the client controller 160 issues the item request 320 from the client 120 to the server 110. In an embodiment the server 110 retrieves the item 170 from the database 145, stores a copy of the item 170 in the server local cache 130, updates the item list 135 for the client 120 respectfully, and outputs the item 170 to the client 120 via the RPC boundary 190. In an embodiment and this situation the client controller 160 receives the item 170 from the server 110, stores the item 170 in the client local cache 140 and provides the item 170 to the client 120. In an embodiment and this case the client 120 can then utilize the new item 170, e.g., to display in its correct position in the client's current U/I view 105. In an embodiment the database change of an item 170 deletion has now been fully propagated through the database query management system 100.

In the situation where a new item 170 has been added to the database 145 and the client 120 cares about this change, e.g., the client 120 is currently maintaining a U/I view 105 that will be altered due to the change, then in an embodiment the client 120 utilizes the information supplied by the client controller 160 for the item addition change to ask the client controller 160 to identify the newly added item 170. In an embodiment the client controller 160 will respond with the id 175 for the newly added item 170. In an embodiment the client 120 issues an item request 320 to the client controller 160 for the newly added item 170.

In an embodiment the newly added item 170 will not be stored in the client local cache 130 as it was just added to the database 145 and has not yet been provided to the client 120. In an embodiment the client controller 160 issues the item request 320 from the client 120 to the server 110. In an embodiment the server 110 retrieves the newly added item 170 from the database 145, stores a copy of the newly added item 170 in the server local cache 130, updates the item list 135 for the client 120 respectfully, and outputs the newly added item 170 to the client 120. In an embodiment and this situation the client controller 160 receives the newly added item 170 from the server 110, stores the newly added item 170 in the client local cache 140 and provides the newly added item 170 to the client 120. In an embodiment and this case the client 120 can then utilize the newly added item 170, e.g., to display in its correct position in the client's current U/I view 105. In an embodiment the database change of an item 170 addition has now been fully propagated through the database query management system 100.

In the situation where an existing item 170 in the database 145 has been modified, e.g., a change to a phone number of a contact item 170, etc., the database 145 provides the modified item 170 stored in the database 145 that was affected by the change to the server controller 150. In an alternative embodiment where an existing item 170 has been modified, the database 145 notifies the server 110 that the item 170 has been modified and the server 110 can thereafter choose to retrieve the modified item 170 from the database 145 if the modification will affect one or more clients 120.

In an embodiment, if there is a copy of the item 170 affected by the database change currently stored in the server local cache 130 the server 110 determines the difference that the database change of an item modification has created. For example, if a phone number has changed for a contact item 170 the server controller 150 identifies the phone number change by comparing the newly modified item 170 with the version of the item 170 currently stored in the server local cache 130. In an embodiment the server 110 replaces the version of the affected item 170 stored in the server local cache 130 with the newly modified item 170 obtained from the database 145. In an embodiment the server 110 issues a change notification message 330, as shown in FIG. 3, to the client(s) 120 for which the item 170 is being stored in the server local cache 130. As noted, in an embodiment the server 110 notifies clients 120 of the change(s) to items 170 but does not supply clients 120 with the newly modified items 170.

In an embodiment, upon receiving a modified item 170 from the database 145, if there is no copy of the item 170 stored in the server local cache 130 and/or the id 175 for the newly modified item 170 is not identified in any maintained item list 135 then no client 120 is currently affected by the change. In this situation and an embodiment the server 110 does nothing more and the database change of an item 170 modification has now been fully propagated through the database query management system 100.

In an embodiment when a client controller 160 receives a change notification message 330 indicating an item 170 has been modified the client 120 is informed that the item 170 has been affected if the modified item 170 is currently registered with the client 120. In an embodiment a client 120 registers with those items 170 that it is currently concerned with, e.g., it is currently displaying in a U/I view 105, and de-registers with an item 170 when it is no longer concerned with the item 170, e.g., when the currently maintained U/I view 105 no longer includes the item 170. In an embodiment each item 170 that is registered with a client 120, also referred to herein as a registered item 170, has an indication 195 that it is registered with the client 120, e.g., a register flag is set, a register bit is set, etc. A register indication 195 for an item 170, also referred to herein as a register flag 195, is cleared, or otherwise toggled or changed from its register value to a new, de-register value, collectively referred to herein as cleared, when the client 120 de-registers with the item 170.

In an embodiment an item 170 stored in the client local cache 140 is cognizant of any changes to it pursuant to a change notification message 330 for the item 170. In an aspect of this embodiment the client controller 160 manages the items 170 stored in the client local cache 140, changes to the items 170 stored in the client local cache 140 and item 170/client 120 communications regarding item 170 modifications.

In an embodiment if the client 120 is not currently registered with the modified item 170 the client 120 is not notified of the item change and the client 120 does nothing. In an embodiment the necessary modifications are made to the copy of the affected item 170 stored in the client local cache 140 pursuant to the information about the change in the change notification message 330. In an aspect of this embodiment the client controller 160 makes the necessary modifications to the copy of the affected item 170 stored in the client local cache 140. In this situation and an embodiment the database change of an item 170 modification has now been fully propagated through the database query management system 100.

In an embodiment and the situation where the client 120 is currently registered with the modified item 170 the client 120 is apprised that the item 170 has been changed. In an aspect of this embodiment the client 120 is apprised that the item 170 has been changed by the item 170 itself. In another aspect of this embodiment the client 120 is apprised that the item 170 has been changed by the client controller 160.

In an aspect of this embodiment and the situation where the client 120 is currently registered with the modified item 170 the client 120 is also apprised of the properties, or fields, of the item 170 that have been modified. In an embodiment if the client 120 cares about any of the changes, e.g., it is currently displaying one or more modified properties of the affected item 170 in a U/I view 105 to a user 180, the client 120 retrieves the item changes it is concerned with. In an embodiment the client 120 can update a U/I view 105 with the retrieved changes to the modified item 170. In an embodiment the client controller 160 makes the necessary modifications to the copy of the affected item 170 stored in the client local cache 140 pursuant to the information about the change in the change notification message 330. In this situation and an embodiment the database change of an item 170 modification has now been fully propagated through the database query management system 100.

In another aspect of this embodiment and the situation where the client 120 is currently registered with the modified item 170 the client 120 is provided the item modifications along with the notification that the item 170 has been modified. In an embodiment if the client 120 cares about any of the changes, e.g., it is currently displaying one or more modified properties of the affected item 170 in a U/I view 105 to a user 180, the client 120 can update a U/I view 105 with any relevant changes to the modified item 170. In an embodiment the client controller 160 makes the necessary modifications to the copy of the affected item 170 stored in the client local cache 140 pursuant to the information in the change notification message 330. In this situation and an embodiment the database change of an item 170 modification has now been fully propagated through the database query management system 100.

In an alternative embodiment when a client controller 160 receives a change notification message 330 indicating an item 170 has been modified the client 120 is informed that the item 170 has been affected. In this alternative embodiment and when the client 120 does not currently care about the item's change because, e.g., it is not currently displaying the item 170 in any U/I view 105, the client 120 does nothing. As in a previously described embodiment in this alternative embodiment and situation the client controller 160 makes the necessary modifications to the copy of the affected item 170 stored in the client local cache 140. The database change of an item 170 modification has now been fully propagated through the database query management system 100.

In an aspect of this alternative embodiment the client 120 is also apprised of what properties, or fields, of the affected item 170 have been modified. As in a previously described embodiment in this aspect of this alternative embodiment and the situation where the client 120 cares about any of the changes, e.g., it is currently displaying one or more modified properties of the affected item 170 in a U/I view 105 to a user 180, the client 120 can update a U/I view 105 with the changes to the modified item 170. As described in a previous embodiment, in this aspect of this alternative embodiment the client controller 160 makes the necessary modifications to the copy of the affected item 170 stored in the client local cache 140. The database change of an item 170 modification has now been fully propagated through the database query management system 100.

In a second alternative embodiment when a client controller 160 receives a change notification message 330 indicating an item 170 has been modified the client controller 160 makes the necessary modifications to the copy of the affected item 170 stored in the client local cache 140 pursuant to the information about the change in the change notification message 330. In an aspect of this second alternative embodiment, if the client 120 is currently registered with the modified item 170 the client 120 is notified that the item 170 has been modified. In an alternative aspect of this second alternative embodiment the client 120 is notified that the item 170 has been modified. In an aspect of this second alternative embodiment, the client 120 is also notified of the properties, or fields, of the item 170, that have been modified, along with any notification that the item 170 has been modified. In this second alternative embodiment if the client 120 cares about the item modification(s) it retrieves the updated, modified, version of the item 170 stored in the client local cache 140. The client 120 can update a U/I view 105 by replacing the item 170 displayed with its respective modified version.

Figure 4:
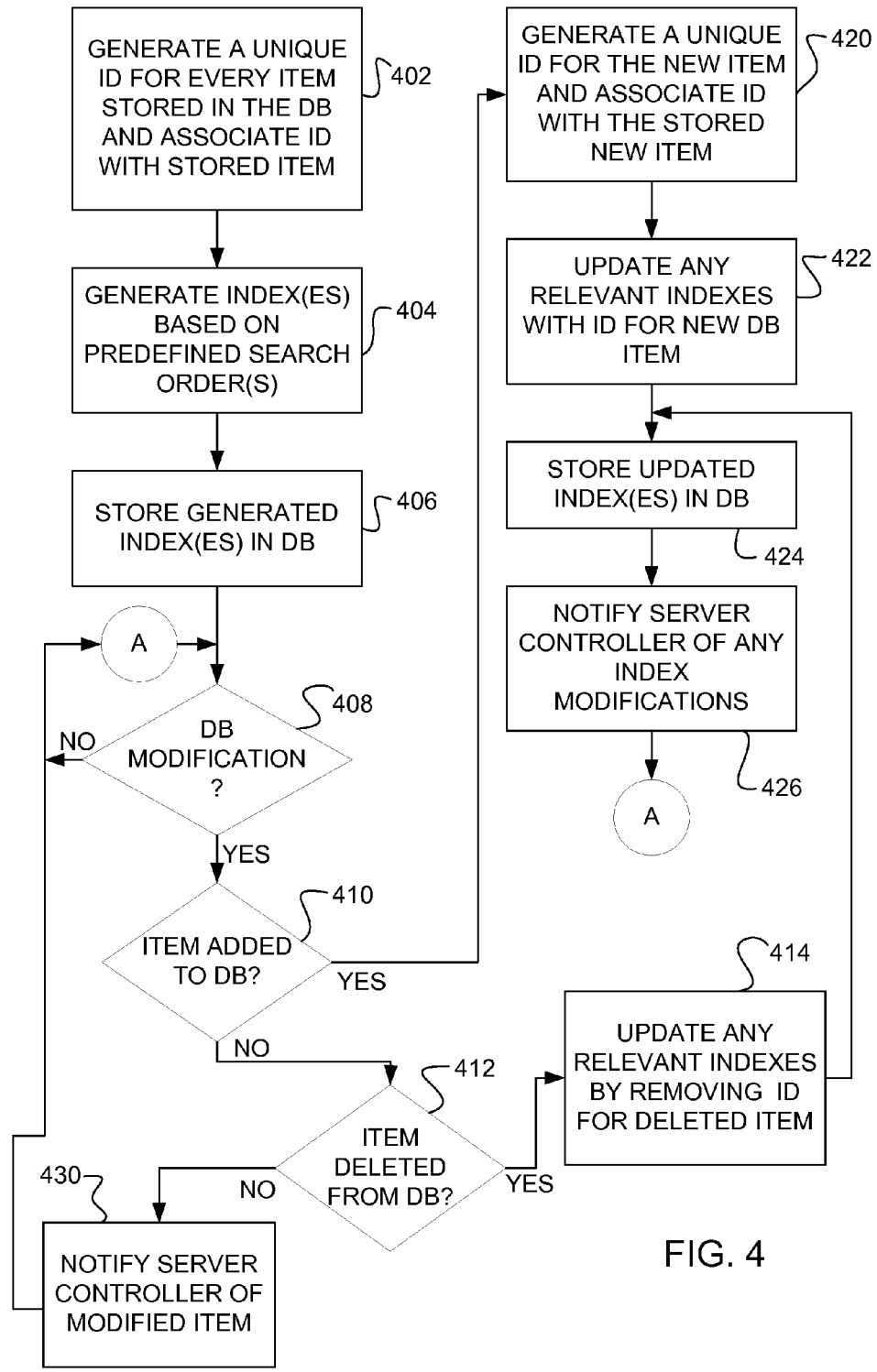
FIG. 4 illustrates an embodiment logic flow for database management in a database query management system.

FIG. 4 illustrates an embodiment logic flow for database management in a database query management system 100. While the following discussion is made with respect to systems portrayed herein the operations described may be implemented in other systems. The operations described herein are not limited to the order shown. Additionally, in other alternative embodiments more or fewer operations may be performed.

Referring to FIG. 4 in an embodiment a unique id is generated for, or otherwise assigned to, every item stored in the database 402. In an embodiment when a new item is stored to the database the new item is assigned a unique id that remains associated with the item as long as the item remains stored in the database 402.

In an embodiment one or more indexes are generated based on predefined search orders and the existing items stored in the database 404. In an embodiment these predetermined indexes are maintained within the database 406.

In an embodiment at decision block 408 a determination is made as to whether there is a database modification, i.e., an item 170 has been added to the database 145, an item 170 has been deleted from the database 145 or an existing database item 170 has been modified. If no, there is nothing remaining for database management for database querying at this juncture, until there is some change to the database 145.

If at decision block 408 there is a database modification, then in an embodiment at decision block 410 a determination is made as to whether an item has been newly added to the database. If yes, in an embodiment a unique id is generated for, or otherwise assigned to, the newly added database item 420. In an embodiment the item's id is associated with the stored new item in the database 420.

In an embodiment any existing indexes that are affected by the addition of the new item to the database are updated accordingly 422. In an embodiment the updated indexes are stored in the database 424. In an embodiment the database notifies the server of each index that was modified due to the addition of the new item stored to the database 426. In an aspect of this embodiment the database notifies the server controller of any modified indexes due to an item addition to the database 426. In an embodiment processing of the item addition to the database is now concluded from the database management perspective.

If at decision block 410 an item has not been newly stored to the database then in an embodiment at decision block 412 a determination is made as to whether an item has been deleted from the database. If yes, in an embodiment any existing indexes that are affected by the item deletion are updated accordingly 414. In an embodiment the updated indexes are stored in the database 424. In an embodiment the database notifies the server of each index that was modified due to the deletion of an item from the database 426. In an aspect of this embodiment the database notifies the server controller of any modified indexes due to an item deletion 426. In an embodiment processing of the item deletion from the database is now concluded from the database management perspective.

If at decision block 412 an item has not been deleted from the database then, as the database has been modified, an existing item stored in the database has been modified. In an embodiment the database notifies the server regarding the modified database item 430. In an aspect of this embodiment the database notifies the server controller of the modified database item 430. In an embodiment processing of the modified item is now concluded from the database management perspective.

FIGS. 5A-5D illustrate an embodiment logic flow for server processing in a database query management system 100. While the following discussion is made with respect to systems portrayed herein the operations described may be implemented in other systems. The operations described herein are not limited to the order shown. Additionally, in other alternative embodiments more or fewer operations may be performed.

Figure 5A:
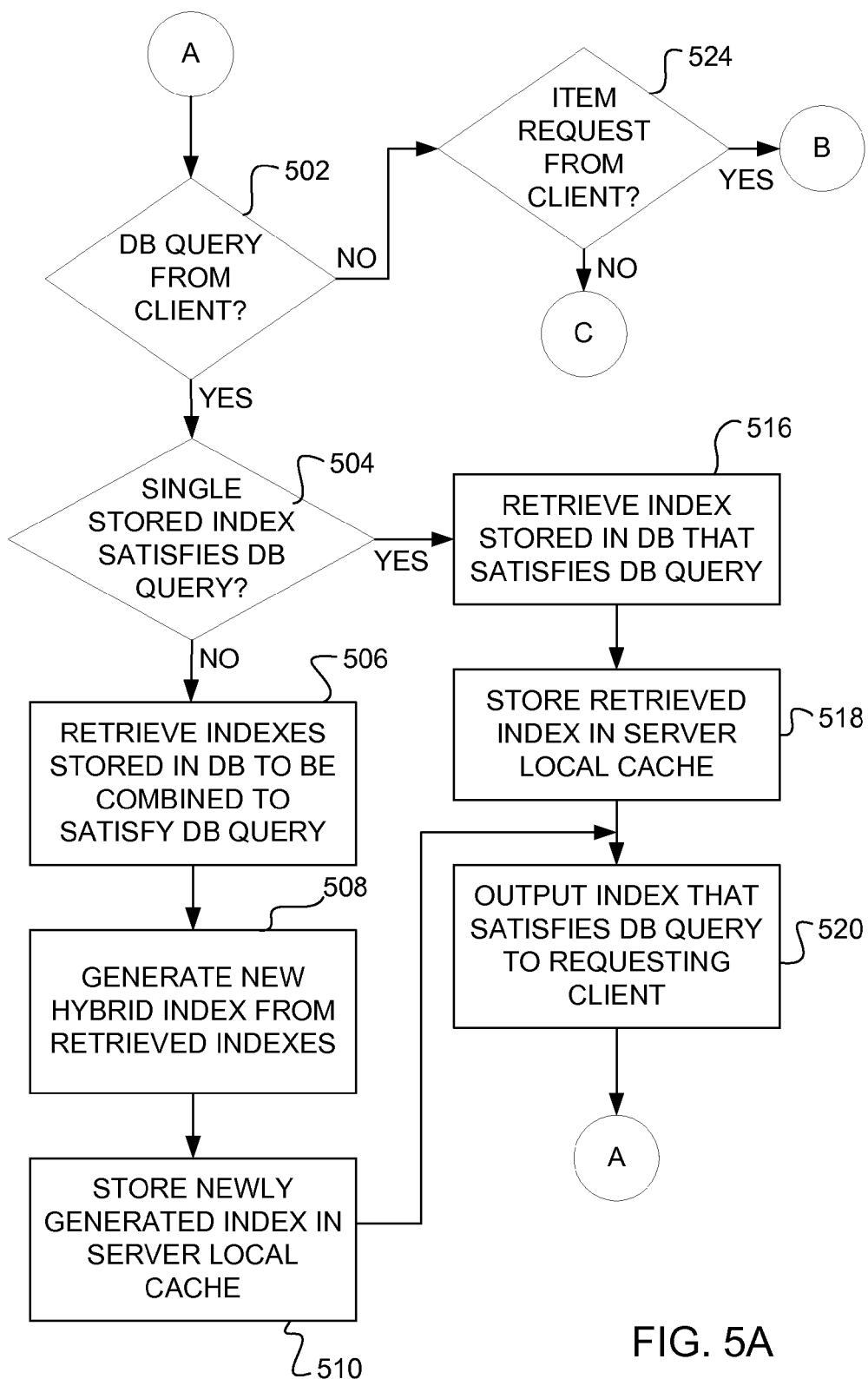
FIGS. 5A-5D illustrate an embodiment logic flow for server processing in a database query management system.
Figure 5B:
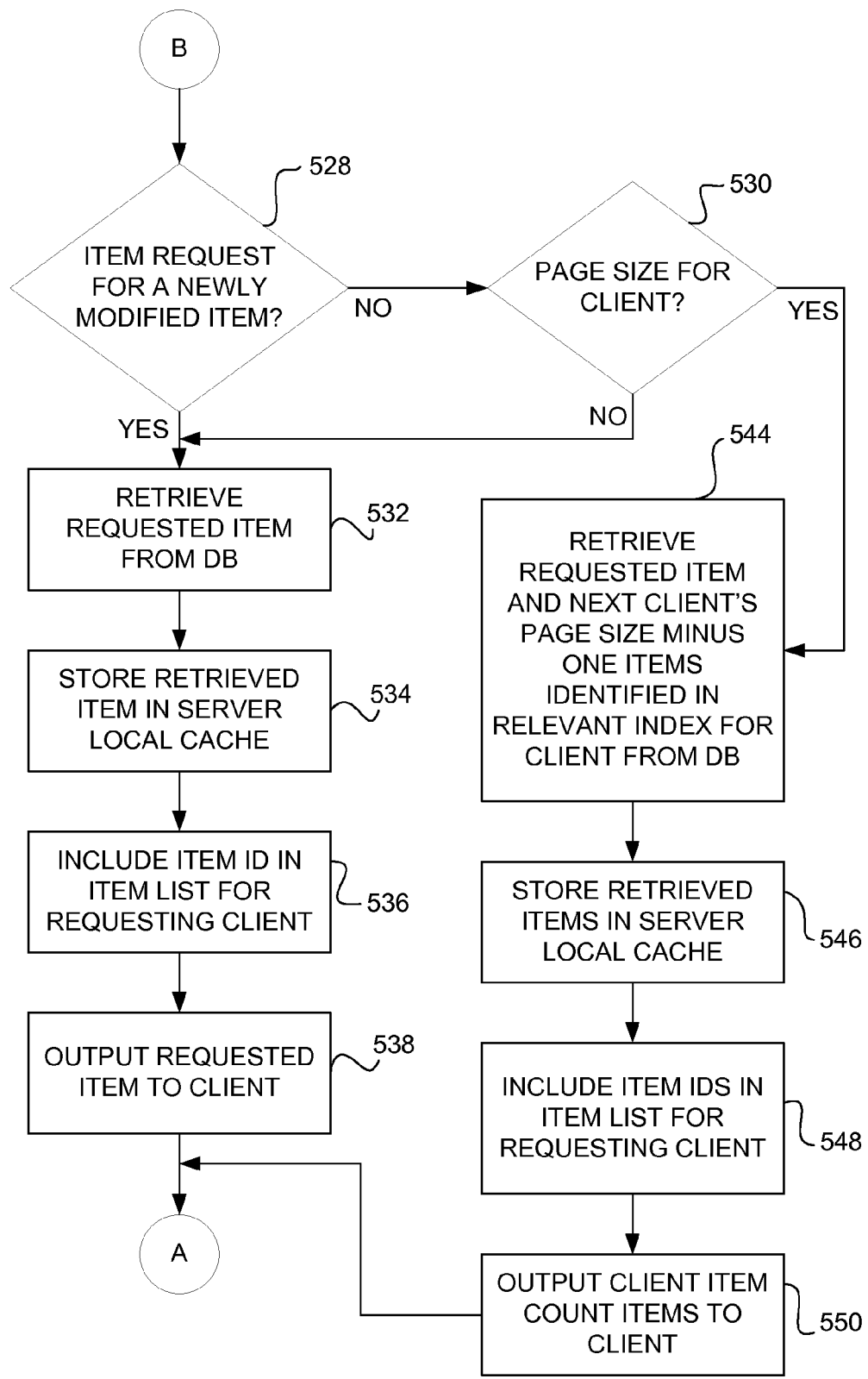

Referring to FIG. 5A in an embodiment at decision block 502 a determination is made as to whether a database query from a client has been received, if yes, in an embodiment at decision block 504 a determination is made as to whether an existing, single, stored index will satisfy the current client database query. If yes, in an embodiment the server retrieves the index stored in the database that satisfies the current client database query 516. In an embodiment the server stores the index retrieved from the database in the server local cache 518. In an embodiment the retrieved index that satisfies the current client database query can be empty, or null, in that while the index exists, there are no items identified in the index because there are currently no items stored in the database that satisfy the predefined search order for which the index was created, or otherwise generated, 520.

In an embodiment the server outputs the index for the current client database query to the requesting client 520. At this juncture in an embodiment server processing of the client database query is finalized until the server receives additional client input.

If at decision block 504 a single existing stored index will not satisfy the current client database query then in an embodiment the server retrieves the indexes that are stored in the database that can be combined, or otherwise utilized together, to generate an index responsive to the current client database query 506. In an embodiment the server generates a new index from the retrieved database indexes that will be responsive to the client database request 508. In an embodiment the server stores the newly generated index in the server local cache 510. In an embodiment the newly generated index that satisfies the current client database query can be empty, or null, in that while the indexes used to create it themselves exist, there are no items identified in the newly generated index because there are currently no items stored in the database that satisfy the search order for which the newly generated index is created, or otherwise generated, 520.

In an embodiment the server outputs the newly generated index for the current client database query to the requesting client 520. At this juncture in an embodiment server processing of the client database query is finalized until the server receives additional client input.

If at decision block 502 the server has not currently received a database query from a client in an embodiment at decision block 524 a determination is made as to whether the server has received an item request from a client. If yes, in an embodiment and referring to FIG. 5B, at decision block 528 a determination is made as to whether the item request is for a newly modified item. If no, indicating that the item request is for managing a database query, e.g., the client may be populating a U/I view for a user, then in an embodiment at decision block 530 a determination is made as to whether there is a page size for the client.

In an embodiment if there is a page size 117 for a client 120 that has issued an item request 320 to the server 110, the client 120 has indicated that it normally utilizes the page size 117 number of items 170 e.g., in a U/I view 105 it generates for a user 180. In an embodiment and this situation the server 110 can output the client's page size 117 number of items 170 to the client 120 in response to the single item request 320 from the client 120.

Thus, at decision block 530 if there is a page size for the client that issued the current item request to the server then in an embodiment the server retrieves the requested item and the next client's page size minus one (page size–1) number of items identified in the relevant index for the client's open database query from the database 544. In this embodiment, therefore, the server retrieves the client's page size number of items from the database in response to the client's current item request 544.

In an embodiment the server stores the retrieved items from the database in the server local cache 546. In an embodiment the server adds the item ids for the retrieved database items to the item list stored in the server local cache for the requesting client 548. In an embodiment the server outputs the retrieved page size number of items to the client 550.

If at decision block 528 the currently received item request is for a newly modified item or if at decision block 530 there is no page size for the client, then in an embodiment the server retrieves the requested item from the database 532. In an embodiment the server stores the retrieved item in the server local cache 534. In an embodiment the server adds the item id for the retrieved database item to the item list stored in the server local cache for the requesting client 536. In an embodiment the server outputs the retrieved item to the client 538.

Figure 5C:
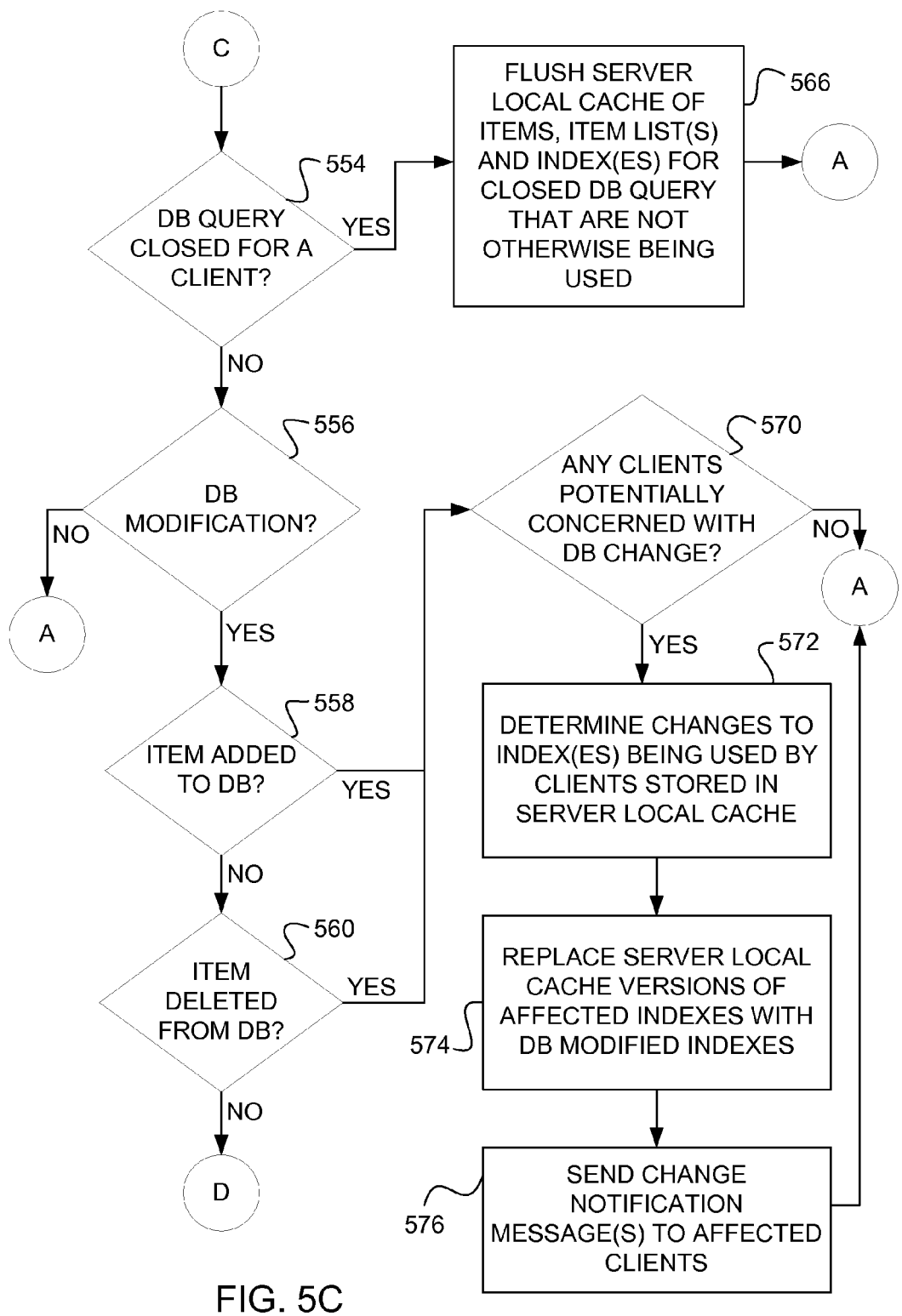

Referring again to FIG. 5A, if at decision block 524 there is no current item request from a client then in an embodiment and referring to FIG. 5C at decision block 554 a determination is made as to whether there is a database query close message from a client, indicating that a client has finished with a currently open database query. If yes, in an embodiment the server flushes the server local cache of items, the item list and the index(es) for the closed database query that are not otherwise being utilized at this time 566.

If at decision block 554 there is no current database query close message from a client then in an embodiment at decision block 556 a determination is made as to whether there has been a database modification, e.g., an item addition to the database, an item deletion from the database or an item modification within the database. If yes, in an embodiment at decision block 558 a determination is made as to whether an item has been added to the database. If yes then in an embodiment at decision block 570 a determination is made as to whether any client(s) would potentially be concerned with this item addition database change; i.e., are there any indexes for any clients stored in the server local cache that are altered by this item addition. If no, in an embodiment server processing for the database item addition is completed.

If at decision block 570 there is at least one client that may be potentially affected by the current item addition to the database then in an embodiment the server determines the changes caused by the item addition to any of the indexes being stored in the server local cache, and thus being utilized by a client, 572. In an aspect of this embodiment the server compares modified indexes updated by the item addition in the database with the respective index versions stored in the server local cache to determine the changes to the server local cache versions of the indexes to be made pursuant to the item addition to the database 572.

In an embodiment the server replaces the indexes that are altered by the new item addition to the database and are stored in the server local cache with the respective updated index versions from the database 574. In an embodiment the server sends a change notification message to each client for which a modification to an index stored in the server local cache has been rendered due to the current item addition to the database 576.

If at decision block 558 a new item has not currently been added to the database then in an embodiment at decision block 560 a determination is made as to whether an item has currently been deleted from the database. If yes then in an embodiment at decision block 570 a determination is made as to whether any client(s) would potentially be concerned with this item deletion database change; i.e., are there any indexes for any clients stored in the server local cache that are altered by this item deletion. If no, in an embodiment server processing for the database item deletion is completed.

If at decision block 570 there is at least one client that may be potentially affected by the current item deletion from the database then in an embodiment the server determines the changes caused by the item deletion to any of the indexes being stored in the server local cache, and thus being utilized by a client, 572. In an aspect of this embodiment the server compares modified indexes updated by the item deletion from the database with the respective index versions stored in the server local cache to determine the changes to the server local cache versions of the indexes to be made pursuant to the item deletion from the database 572.

In an embodiment the server replaces the indexes that are altered by the item deletion from the database and are stored in the server local cache with the respective updated index versions from the database 574. In an embodiment the server sends a change notification message to each client for which a modification to an index stored in the server local cache has been rendered due to the current item deletion from the database 576.

Figure 5D:
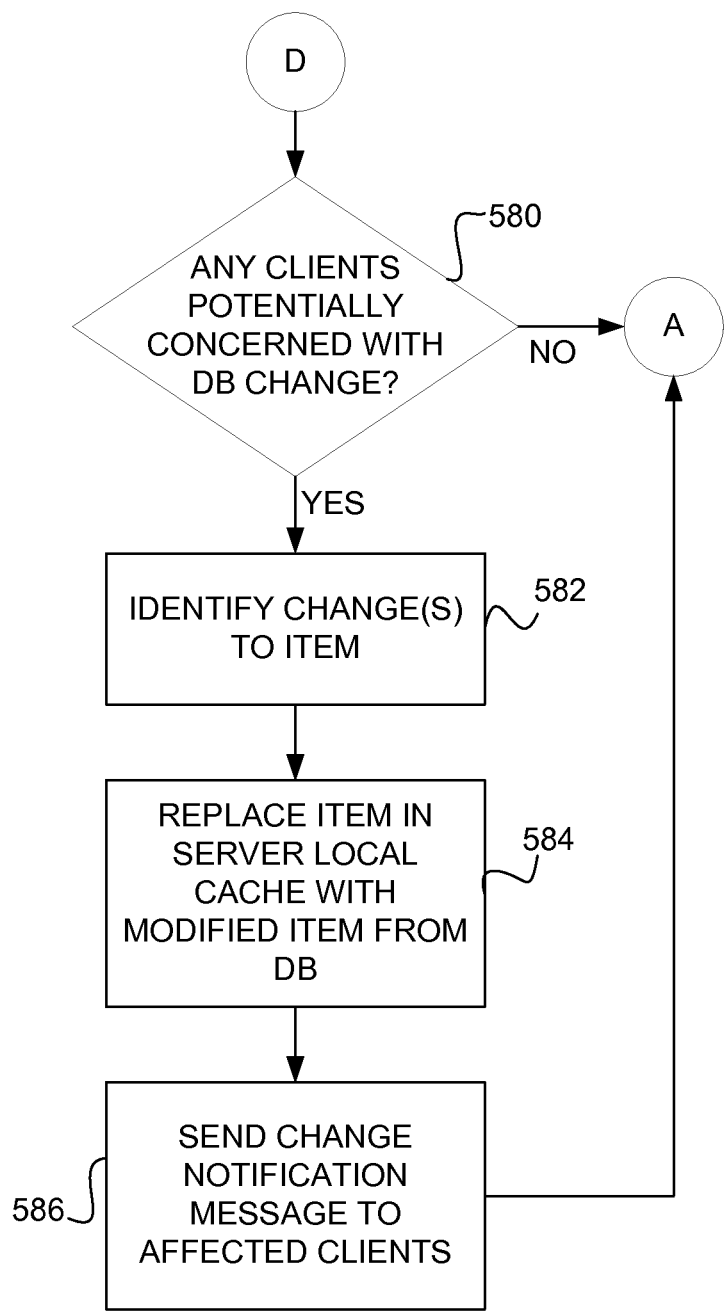

If at decision block 560 an item has not currently been deleted from the database then in an embodiment an item stored within the database has currently been modified. Referring to FIG. 5D in an embodiment at decision block 580 a determination is made as to whether any client(s) would potentially be concerned with this item modification database change; e.g., are there any item lists for any clients stored in the server local cache that include the id for the currently modified database item. If no, in an embodiment server processing for the database item modification is completed.

If at decision block 580 there is at least one client that may be potentially affected by, or otherwise concerned with, the current item modification then in an embodiment the server identifies the changes to the modified item 582. In an aspect of this embodiment the server compares the modified item version stored in the database with the respective item version stored in the server local cache to identify the modification(s) made to the item 582.

In an embodiment the server replaces the item version stored in the server local cache with the modified item version from the database 584. In an embodiment the server sends a change notification message to each client whose corresponding item list stored in the server local cache includes the id for the modified item, i.e., to each client that has an open database query during which the client requested, and was output, the now modified item 586.

Figure 6A:
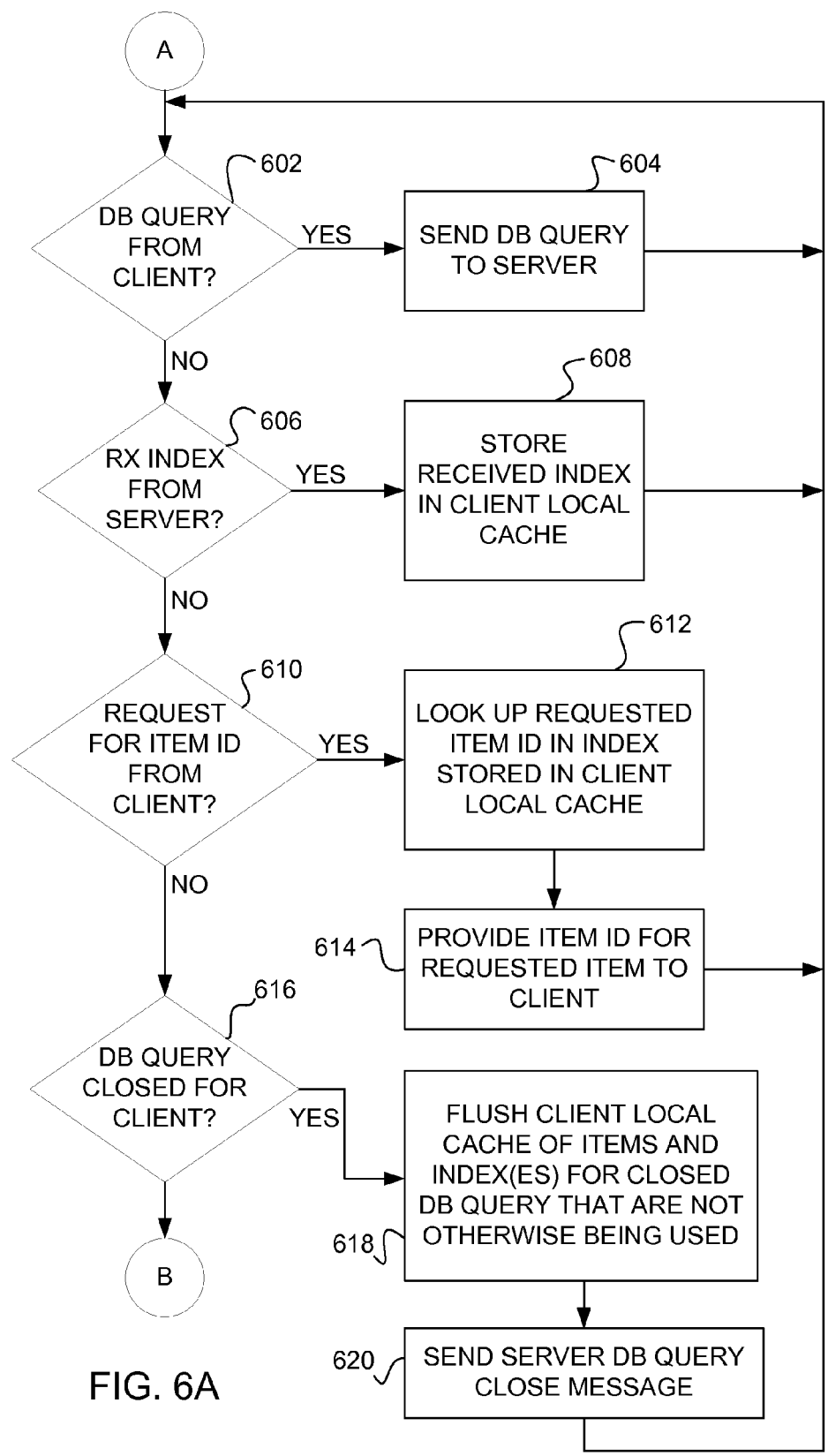
FIGS. 6A-6C illustrate an embodiment logic flow for client controller processing in a database query management system.
Figure 6B:
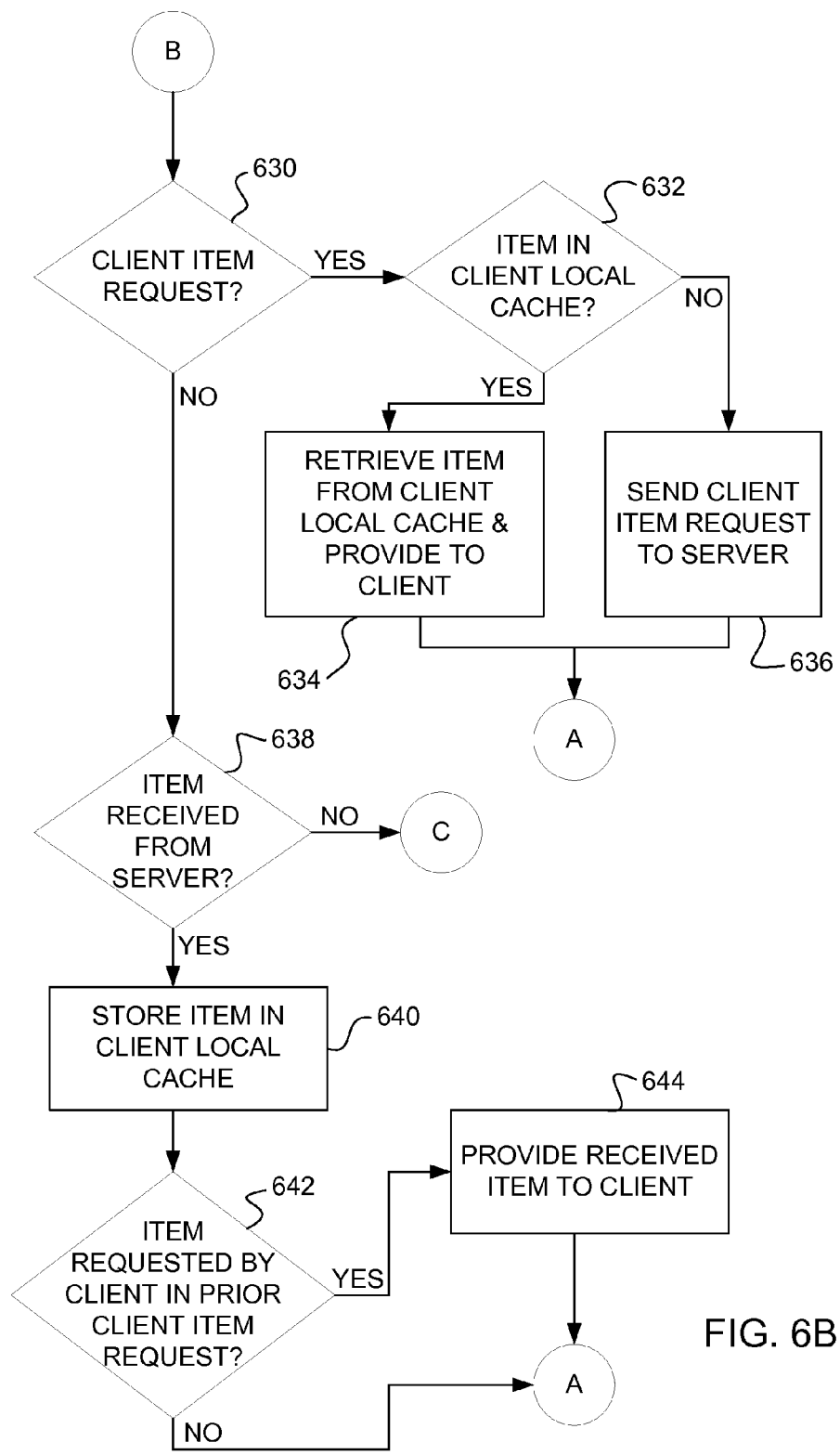
Figure 6C:
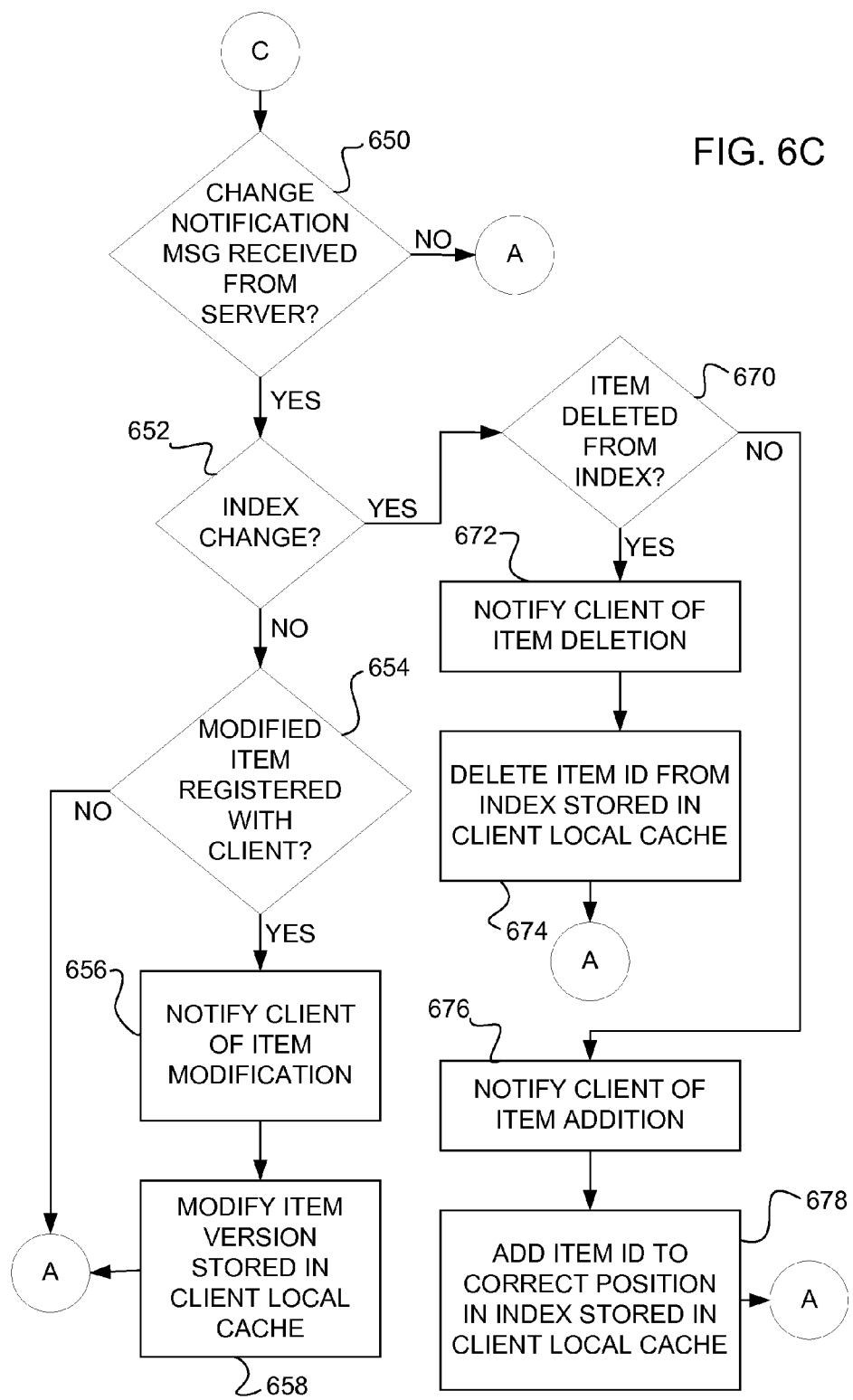

FIGS. 6A-6C illustrate an embodiment logic flow for client controller processing supporting client database query handling in a database query management system 100. While the following discussion is made with respect to systems portrayed herein the operations described may be implemented in other systems. The operations described herein are not limited to the order shown. Additionally, in other alternative embodiments more or fewer operations may be performed.

Referring to FIG. 6A in an embodiment at decision block 602 a determination is made as to whether a database query has been received from the client. If yes, in an embodiment the client controller outputs the database query to the server supporting the database 604.

If at decision block 602 there is no current database query from the client then in an embodiment at decision block 606 a determination is made as to whether an index has been input, or otherwise received, from the server supporting the database. If yes, in an embodiment the client controller stores the received index in the client local cache 608.

If at decision block 606 no index has been currently received from the server then in an embodiment at decision block 610 a determination is made as to whether there is a request for an item id from the client, i.e., whether the client is requesting the identification of an item in a particular position in an index. If yes, in an embodiment the client controller looks up, or otherwise identifies, the specific item, via its id, in an index stored in the client local cache 612. In an embodiment the client controller provides an identification of the item, e.g., its id, to the client, in response to the client's item id request 614. In an embodiment if the index stored in the client local cache is empty, because there is no item stored in the database that satisfies the search order for which the index was generated, then the client controller provides this null information, i.e., an empty set, or response, to the client, in response to the client's item id request 614. In alternative embodiments if the index stored in the client local cache is empty the client controller can indicate this to the client in different manners, e.g., by providing a null item id indicating the respective index is empty, by failing to provide any response which will result in the client timing out, etc., 614.

If at decision block 610 there is no current request for an item identification from the client then in an embodiment at decision block 616 a determination is made as to whether there is a database query close message, or notification of the termination of a database query, by the client. If yes, in an embodiment the client controller flushes, or otherwise deletes from, the client local cache the items and index(es) stored therein for the now closed database query that are not otherwise currently being utilized 618. In an embodiment the client controller outputs the database query close message to the server 620.

If at decision block 616 there is no current database query close message from the client, then in an embodiment and referring to FIG. 6B at decision block 630 a determination is made as to whether there is a current item request from the client, i.e., a request for an item from the client. If yes, in an embodiment at decision block 632 a determination is made as to whether the requested item is currently stored in the client local cache. If yes, in an embodiment the client controller retrieves the requested item from the client local cache and provides it to the client 634.

If, however, the requested item is not currently stored in the client local cache then in an embodiment the client controller outputs the client item request to the server supporting the database 636.

If at decision block 630 there is no current client item request to process then in an embodiment at decision block 638 a determination is made as to whether an item has been received from the server. If yes, then in an embodiment the client controller stores the received item in the client local cache 640. In an embodiment at decision block 642 a determination is made as to whether the received item was requested by the client in a client item request. If yes, in an embodiment the client controller provides the received item to the client 644.

If at decision block 638 there is no currently received item from the server to process then in an embodiment and referring to FIG. 6C at decision block 650 a determination is made as to whether there is a change notification message received from the server. If yes, in an embodiment at decision block 652 a determination is made as to whether the change notification message indicates that there is an index change. If yes, in an embodiment at decision block 670 a determination is made as to whether the change notification message indicates that an item id is no longer included in an index, i.e., an item has been deleted from the database that may be relevant to the client's current processing and, e.g., maintenance of an U/I view to a user.

If the current change notification message pertains to a database item deletion, and thus, the removal of an item id from an index currently being utilized by the client, then in an embodiment the client controller notifies the client of the item deletion 672. In an embodiment the client controller deletes the item id identified in the received change notification message from the pertinent index(es) stored in the client local cache 674. In an embodiment client controller processing of an item deletion notification from the server is completed.

If at decision block 670 the change notification message is not for an item id that is no longer included in an index then it is for an item id that has been newly added to an index; i.e., the currently received change notification message is for an item that has been newly added to the database and which may be relevant to the client's current processing and, e.g., maintenance of an U/I view to the user. In an embodiment the client controller notifies the client of the item addition 676. In an embodiment the client controller adds the item id identified in the received change notification message to the appropriate position for the pertinent index(es) stored in the client local cache 678. In an embodiment client controller processing of an item addition notification from the server is completed.

If at decision block 652 the currently received change notification message is not for an index change, i.e., it is not for a database item addition or deletion, then the change notification message is for a database item modification. In an embodiment at decision block 654 a determination is made as to whether the item identified in the received change notification message is currently registered with the client, and thus the client has indicated that it is concerned with the item and wants to be apprised of any changes to it. If yes, the client controller notifies the client of the item modification 656. In an aspect of this embodiment the client controller identifies the specific modification(s) rendered to the item to the client 656. In an embodiment the client controller modifies the version of the item stored in the client local cache pursuant to the modification information included in, or otherwise identified by, the received change notification message 658. In an embodiment client controller processing of a database item modification is completed.

Computing Device System Configuration

Figure 7:
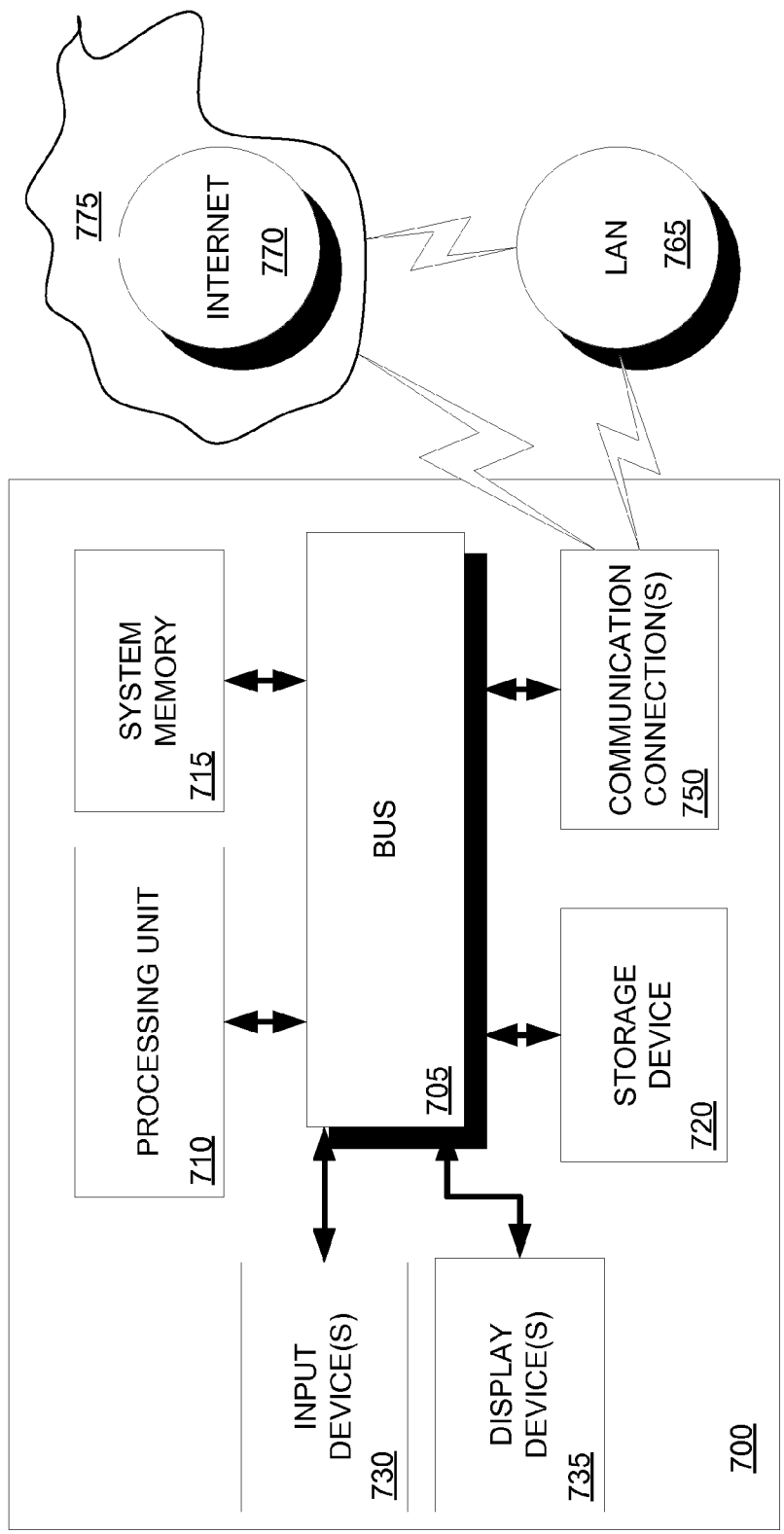
FIG. 7 is a block diagram of an exemplary basic computing device with the capability to process software, i.e., program code, or instructions.

FIG. 7 is a block diagram that illustrates an exemplary computing device system, also referred to herein as a computing device, 700 upon which an embodiment server, an embodiment database or portions thereof, and an embodiment client can each be implemented, or otherwise supported or enabled. Examples of computing devices 700 include, but are not limited to, computers, e.g., desktop computers, computer laptops, also referred to herein as laptops, notebooks, mainframe computing systems, etc.; etc.

The embodiment computing device 700 includes a bus 705 or other mechanism for communicating information, and a processing unit 710, also referred to herein as a processor 710, coupled with the bus 705 for processing information. The computing device 700 also includes system memory 715, which may be volatile or dynamic, such as random access memory (RAM), non-volatile or static, such as read-only memory (ROM) or flash memory, or some combination of the two. The system memory 715 is coupled to the bus 705 for storing information and instructions to be executed by the processing unit 710, and may also be used for storing temporary variables or other intermediate information during the execution of instructions by the processor 710. The system memory 715 often contains an operating system and one or more programs, or applications, and/or software code, and may also include program data.

In an embodiment a storage device 720, such as a magnetic or optical disk, solid state drive, flash drive, etc., is also coupled to the bus 705 for storing information, including program code of instructions and/or data. In the embodiment computing device 700 the storage device 720 is computer readable storage, or machine readable storage, 720.

Embodiment computing devices 700 generally include one or more display devices 735, such as, but not limited to, a display screen, e.g., a cathode ray tube (CRT) or liquid crystal display (LCD), a printer, and one or more speakers, for providing information to the computing device's users 180. Embodiment computing devices 700 also generally include one or more input devices 730, such as, but not limited to, a keyboard, mouse, trackball, pen, voice input device(s), and touch input devices, which users 180 can utilize to communicate information and command selections to the processor 710. All of these devices are known in the art and need not be discussed at length here.

The processor 710 executes one or more sequences of one or more programs, or applications, and/or software code instructions contained in the system memory 715. These instructions may be read into the system memory 715 from another computing device-readable medium, including, but not limited to, the storage device 720. In alternative embodiments, hard-wired circuitry may be used in place of or in combination with software instructions. Embodiment computing device 700 environments are not limited to any specific combination of hardware circuitry and/or software.

The term "computing device-readable medium" as used herein refers to any medium that can participate in providing program, or application, and/or software instructions to the processor 710 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 715 and storage device 720 of embodiment computing devices 700 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device 700 also includes one or more communication connections 750 coupled to the bus 705. Embodiment communication connection(s) 750 provide a two-way data communication coupling from the computing device 700 to other computing devices on a local area network (LAN) 765 and/or wide area network (WAN), including the world wide web, or internet, 770 and various other communication networks 775, e.g., SMS-based networks, telephone system networks, etc. Examples of the communication connection(s) 750 include, but are not limited to, an integrated services digital network (ISDN) card, modem, LAN card, and any device capable of sending and receiving electrical, electromagnetic, optical, acoustic, RF or infrared signals.

Communications received by an embodiment computing device 700 can include program, or application, and/or software instructions and data. Instructions received by the embodiment computing device 700 may be executed by the processor 710 as they are received, and/or stored in the storage device 720 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for server-side processing in a database query management environment, wherein the database query management environment comprises a database comprising the capability to store at least one item and the capability to store at least one index, and a server comprising the capability to process database queries to the database, the method comprising:
   receiving, from a client, a database query comprising a received database query;
   accessing an index stored in the database, wherein the index that is accessed comprises an accessed index, and outputting the accessed index in response to the received database query, wherein the outputted index identifies at least one item stored in the database in its appropriate position for a predefined search order of at least one item stored in the database;
   storing the accessed index in a server local cache and sending the accessed index to the client to be stored in a client local cache by a client controller;
   receiving an item request for an item comprising a received item request, the item request having been generated at the client according to the accessed index stored at the client local cache;
   accessing an item stored in the database in response to a received item request wherein the item that is accessed comprises an accessed item;
   outputting the accessed item in response to the received item request;
   storing items that are output by the server, including the accessed item, in the server local cache;
   flushing the server local cache of at least one item output by the server, the flushing in response to receiving a database query close message, wherein the item that is flushed from the server local cache comprises an item identified in the accessed index and identified as closed in the received database query close message; and
   generating and outputting a change notification that identifies a change to the accessed index comprising the deletion of the index entry from the accessed index.

2. The method for server-side processing in a database query management environment of claim 1, further comprising:
   receiving a second database query comprising a second received database query;
   accessing at least two different indexes stored in the database in response to the second received database query;
   generating a new index from the at least two accessed different indexes stored in the database wherein the new index is responsive to the second received database query;
   outputting the new index in response to the second received database query; and
   storing the new index in the server local cache.

3. The method for server-side processing in a database query management environment of claim 2, wherein the new index is maintained stored in the server local cache until a database query close indication is received that indicates that the second received database query for which the new index was generated in response to is closed.

4. The method for server-side processing in a database query management environment of claim 1, further comprising:
  storing a page size;
  receiving an item request comprising a received item request;
  accessing the stored page size number of items in the database in response to the received item request wherein the items that are accessed comprise accessed items and wherein the accessed items comprise the item identified in the received item request and the accessed items further comprise the group of items identified in an index in sequential order following the identification of the item in the index identified in the received item request;
  outputting each of the page size number of accessed items in response to the received item request; and
  storing an identification of each accessed item in the server local cache.

5. The method for server-side processing in a database query management environment of claim 1, further comprising flushing the server local cache of at least one index stored in the server local cache that is responsive to a received database query pursuant to a notification that the received database query is closed.

6. The method for server-side processing in a database query management environment of claim 1, the method further comprising:
  receiving an indication from the database of a modification to the database wherein the modification comprises the addition of an item stored to the database;
  identifying a change to at least one index stored in the server local cache that is to be made pursuant to the database modification wherein the change comprises adding an index entry to the index;
  replacing an index stored in the server local cache that is to be modified pursuant to the database modification with a version of the index accessed in the database subsequent to the database modification;
  generating a change notification comprising a generated change notification that identifies a change to an index comprising the addition of an index entry to the index; and
  outputting the generated change notification.

7. The method for server-side processing in a database query management environment of claim 1, the method further comprising:
  receiving an indication from the database of a modification to the database wherein the modification comprises the deletion of an item from storage in the database;
  identifying a change to at least one index stored in the server local cache that is to be made pursuant to the database modification wherein the change comprises deleting an index entry from the index;
  replacing an index stored in the server local cache that is to be modified pursuant to the database modification with a version of the index accessed in the database subsequent to the database modification.

8. The method for server-side processing in a database query management environment of claim 1, the method further comprising:
  receiving an indication from the database of a modification to the database wherein the modification to the database comprises a modification of an item currently stored in the database;
  identifying the modification made to the item currently stored in the database;
  generating a change notification comprising a generated change notification that identifies the modification made to an item currently stored in the database; and
  outputting the generated change notification.

9. A method for client controller processing in a database query management environment for a client within the database query management environment, wherein the client comprises the client controller and the client further comprises the capability to perform database queries to a database within the database query management environment and the capability to generate and maintain a U/I view to a user of the database query management environment in response to a data query from a user, and wherein the database query management environment comprises a database comprising the capability to store at least one item and the capability to store at least one index responsive to a database query from the client, the method comprising:
  outputting a database query issued from the client and obtained by the client controller of the client from the client controller;
  storing an index, received in response to the database query output by the client controller, to a client local cache and to a server local cache;
  utilizing the index in the local server cache, received in response to the database query output by the client controller, to inform the client of a predetermined order for items stored in the database that is responsive to a data query from a user and which can be utilized by the client to generate a U/I view comprising at least one item stored in the database;
  outputting an item request obtained by the client controller from the client from the client controller;
  receiving only those items stored in the database that are responsive to an item request from the client that is processing a database query; and
  providing a single item to the client in response to an item request from the client received by the client controller, and storing the single item in the server local cache and in the client local cache;
  flushing the server local cache of at least one item output by the server, the flushing in response to receiving a database query close message, wherein the item that is flushed from the server local cache comprises an item identified in the index and identified as closed in the received database query close message; and
  generating and outputting a change notification that identifies a change to the index client local cache comprising the deletion of the index entry from the client local cache index.

10. The method for client controller processing in a database query management environment of claim 9, further comprising receiving a single item stored in the database that is responsive to an item request output from the client controller in response to the item request output from the client controller, wherein the single item is identified in the item request output from the client controller.

11. The method for client controller processing in a database query management environment of claim 9, the method further comprising:
  establishing a page size for the client wherein the page size identifies the number of items the client can utilize at any single time in the generation and maintenance of a U/I view to a user;
  receiving the page size number of items stored in the database that are responsive to an item request output from the client controller in response to the item request output from the client controller, wherein the page size number of items received comprises the item identified in the item request output from the client controller and the page size number of items received further comprises the group of items identified in an index in sequential order following the identification of the item in the index identified in the item request output from the client controller.

12. The method for client controller processing in a database query management environment of claim 9, further comprising:
storing all items received by the client controller in the client local cache;
obtaining an item request from a client for an item to be utilized by the client in a U/I view;
outputting the item request received from the client from the client controller when the item identified in the item request is not stored in the client local cache;
retrieving the item identified in the item request obtained from the client from the client local cache when the item identified in the item request obtained from the client is stored in the client local cache; and
providing an item retrieved from the client local cache in response to an item request obtained from the client to the client.

13. The method for client controller processing in a database query management environment of claim 9, further comprising:
receiving a change notification message comprising an identification of a database change comprising the addition of an item comprising an item id to the database;
notifying the client that a new item has been stored to the database that is responsive to a database query the client is currently processing; and
adding the item id of the new item that has been stored to the database in the correct position of an index stored in the client local cache.

14. The method for client controller processing in a database query management environment of claim 9, further comprising:
receiving a change notification message comprising an identification of a database change comprising the deletion of an item comprising an item id from the database;
notifying the client that an item that is responsive to a database query the client is currently processing has been deleted from the database; and
removing the item id of the item that has been deleted from the database from at least one index stored in the client local cache.

15. The method for client controller processing in a database query management environment of claim 9, further comprising:
receiving a change notification message comprising an identification of a database change comprising the alteration of an item comprising an item id stored within the database; notifying the client that an item that is responsive to the database query the client is currently processing has been altered when the altered item is registered with the client; and
modifying the item identified in the change notification message and stored in the client local cache to generate a new version of the item identified in the change notification message and stored in the client local cache, wherein the new version of the item comprises a modification made to the item identified in the change notification message and stored in the database.

\* \* \* \* \*